United States Patent
Krawczewicz et al.

(10) Patent No.: US 10,552,645 B2
(45) Date of Patent: *Feb. 4, 2020

(54) METHOD FOR SECURE COMMUNICATIONS USING NFC CRYPTOGRAPHIC SECURITY MODULE

(71) Applicant: Tocreo Labs, L.L.C., Annapolis, MD (US)

(72) Inventors: Mark Stanley Krawczewicz, Annapolis, MD (US); Richard C. Schaeffer, Jr., Severna Park, MD (US); Kenneth Hugh Rose, Annapolis, MD (US); Thomas J. Krawczewicz, Silver Spring, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/526,005

(22) Filed: Jul. 30, 2019

(65) Prior Publication Data

US 2019/0354729 A1 Nov. 21, 2019

Related U.S. Application Data

(63) Continuation of application No. 15/730,929, filed on Oct. 12, 2017, now Pat. No. 10,387,689.

(Continued)

(51) Int. Cl.
*G06F 21/85* (2013.01)
*H04L 9/32* (2006.01)
(Continued)

(52) U.S. Cl.
CPC ........... *G06F 21/85* (2013.01); *H04B 5/0062* (2013.01); *H04L 9/32* (2013.01); *H04W 12/06* (2013.01);
(Continued)

(58) Field of Classification Search
CPC ...... G06F 21/85; H04B 5/0062; H04W 12/06; H04W 4/10; H04W 4/90; H04W 4/80; H04W 4/70; H04L 9/32
See application file for complete search history.

(56) References Cited

U.S. PATENT DOCUMENTS 8,594,563 B2 * 11/2013 Waters ............... H04L 63/0853
455/41.1
8,880,027 B1 * 11/2014 Darringer ............... G06F 21/35
455/41.1

(Continued)

*Primary Examiner* — J. Brant Murphy

(74) *Attorney, Agent, or Firm* — 24IP Law Group USA, PLLC; Timothy Dewitt

(57) ABSTRACT

A cryptographic security token having a secure microprocessor, a secure bus connected to said secure microprocessor, a bus isolation microcontroller connected to said secure bus wherein said bus isolation microcontroller comprises firmware for controlling communications through said secure bus to said secure microprocessor, a first NFC antenna connected to said bus isolation microcontroller, and a second NFC antenna connected to said secure microprocessor. The secure microprocessor and said bus isolation microprocessor are powered by energy received through said first NFC antenna and said second NFC antenna. The cryptographic security token receives data from outside said cryptographic security token only through said first NFC antenna. The token or module may further have a bi-state or bi-stable display and a secure memory, each connected to the secure microprocessor by a secure bus.

1 Claim, 13 Drawing Sheets

Related U.S. Application Data

(60) Provisional application No. 62/562,329, filed on Sep. 22, 2017.

(51) Int. Cl.
*H04W 12/06* (2009.01)
*H04B 5/00* (2006.01)
H04W 4/70 (2018.01)
H04W 4/10 (2009.01)
H04W 4/90 (2018.01)
H04W 4/80 (2018.01)

(52) U.S. Cl.
CPC ............... *H04W 4/10* (2013.01); *H04W 4/70* (2018.02); *H04W 4/80* (2018.02); *H04W 4/90* (2018.02)

(56) References Cited

U.S. PATENT DOCUMENTS

| | | | | |
|---|---|---|---|---|
| 9,420,403 | B1* | 8/2016 | Annan | H04W 4/80 |
| 9,674,785 | B2* | 6/2017 | Enomoto | H04W 52/0225 |
| 2004/0153672 | A1* | 8/2004 | Watt | G06F 9/3012 |
| | | | | 726/22 |
| 2006/0208066 | A1* | 9/2006 | Finn | G06K 7/0004 |
| | | | | 235/380 |
| 2007/0294761 | A1* | 12/2007 | Chen | G06F 21/85 |
| | | | | 726/18 |
| 2009/0199004 | A1* | 8/2009 | Krawczewicz | G06K 19/0718 |
| | | | | 713/172 |
| 2009/0215385 | A1* | 8/2009 | Waters | H04L 63/0853 |
| | | | | 455/1 |
| 2010/0030695 | A1* | 2/2010 | Chen | G06Q 20/204 |
| | | | | 705/67 |
| 2010/0088188 | A1* | 4/2010 | Kumar | G06Q 20/10 |
| | | | | 705/17 |
| 2011/0185183 | A1* | 7/2011 | Yamamoto | G06F 21/33 |
| | | | | 713/182 |
| 2012/0159148 | A1* | 6/2012 | Behren | G06Q 20/3552 |
| | | | | 713/150 |
| 2012/0321084 | A1* | 12/2012 | Le Saint | H04L 9/3234 |
| | | | | 380/277 |
| 2012/0323717 | A1* | 12/2012 | Kirsch | G06Q 20/0855 |
| | | | | 705/26.1 |
| 2013/0097348 | A1* | 4/2013 | Milbrandt | G06F 13/36 |
| | | | | 710/110 |
| 2013/0152185 | A1* | 6/2013 | Singh | G06F 21/35 |
| | | | | 726/9 |
| 2013/0191232 | A1* | 7/2013 | Calman | G07F 19/201 |
| | | | | 705/18 |
| 2013/0200146 | A1* | 8/2013 | Moghadam | G06Q 40/04 |
| | | | | 235/379 |
| 2013/0232082 | A1* | 9/2013 | Krawczewicz | G06F 19/324 |
| | | | | 705/55 |
| 2014/0075567 | A1* | 3/2014 | Raleigh | H04W 12/10 |
| | | | | 726/26 |
| 2014/0149746 | A1* | 5/2014 | Yau | G06F 21/35 |
| | | | | 713/185 |
| 2014/0207680 | A1* | 7/2014 | Rephlo | G06Q 20/322 |
| | | | | 705/44 |
| 2015/0012437 | A1* | 1/2015 | Park | G06Q 20/4014 |
| | | | | 705/44 |
| 2015/0186876 | A1* | 7/2015 | Chen | G06Q 20/204 |
| | | | | 705/67 |
| 2015/0282085 | A1* | 10/2015 | Enomoto | H04W 52/0225 |
| | | | | 455/574 |
| 2016/0125180 | A1* | 5/2016 | Smith | H04L 9/0822 |
| | | | | 726/7 |
| 2016/0156386 | A1* | 6/2016 | Van Nieuwenhuyze | G06K 7/10237 |
| | | | | 455/41.1 |
| 2016/0306977 | A1* | 10/2016 | Zarakas | G06F 8/654 |
| 2016/0335619 | A1* | 11/2016 | Ce | G06Q 20/02 |
| 2017/0156022 | A1* | 6/2017 | Keller | H04B 5/0031 |

* cited by examiner

METHOD FOR SECURE COMMUNICATIONS USING NFC CRYPTOGRAPHIC SECURITY MODULE

CROSS-REFERENCE TO RELATED APPLICATIONS

The present application is a continuation of U.S. Non-provisional patent application Ser. No. 15/730,929, filed on Oct. 12, 2017, which claims the benefit of the filing date of U.S. Provisional Patent Application Ser. No. 62/562,329 filed by the present inventors on Sep. 22, 2017.

The aforementioned patent applications are hereby incorporated by reference in their entirety.

STATEMENT REGARDING FEDERALLY SPONSORED RESEARCH OR DEVELOPMENT

None.

BACKGROUND OF THE INVENTION

Field of the Invention

The present invention relates to a system and method for securing a mobile device using a near field communication (NFC) cryptographic module.

Brief Description of the Related Art

Near Field Communication (NFC) is a wireless magnetic field induced communication channel with a maximum range around 15 centimeters (6 inches). Communication operates on the ISM band of 13.56 MHz with data rates up to 424 kbps. Mobile handsets, tablets, laptops, POS and access control terminals, smart cards, tags, labels, wristband, and electronic identification chips are some of the device types currently equipped with NFC and to be used with security sensitive applications, such as electronic ticketing, payments, identification, and access control.

Eavesdropping of the NFC data channel between the smartphone and an NFC token is feasible by a malicious hacker and one countermeasure to address this vulnerability is encryption. The NFC communication protocol does not offer any security in itself, and transferred data can be picked up at a distance of approximately 20-30 cm using an improvised antenna without any signal amplification or filtering circuitry.

The NFC channel can be easily encrypted without adding any custom hardware to the smartphone. The reason for this is the majority of the handset vendors utilized an NFC chipset that embed a cryptographic processor within the smartphone transceiver chip.

In addition, most vendors NFC transceiver chips incorporate both a programmable hardware processor and a secured memory. The secured memory can store symmetric or asymmetric cryptographic keys for the NFC channel encryption or sensitive user data like credit card data, public key splits, or other sensitive user data.

Near Field Communications (NFC) has become a ubiquitous feature within most smartphones, mainly as a means to conduct secure mobile payment transactions. The concept of secure mobile payments entails downloading your credit card information into a trusted data container in the smartphone; then allowing, through the NFC wireless interface, the user to make trusted payments to a traditional Point of Sale (POS) terminal, over the internet, or directly to another user's smartphone. Although NFC has inherent attributes ideal from a security perspective, NFC standards and hardware technology have fallen short in countering vulnerabilities.

The NFC features of smartphones also have been tapped to increase security for peer-to-peer communications. For example, U.S. Pat. No. 9,674,785 disclosed a system and method for secure mobile communications between a first user having a first mobile communications device and a first secure token and a second user having a second mobile communications device and a second secure token. The first and second mobile devices each had a near-field communications reader, a user interface and a display. The first secure token had a first secure processor, a first secure non-volatile memory having decryption key information stored therein, a first display, a first power near-field communications antenna and a first data near-field communications antenna. The second secure token similarly had a second secure processor, a second secure non-volatile memory having decryption key information stored therein, a second display, a second power near-field communications antenna and a second data near-field communications antenna. The method comprised the steps of performing verification of a first user, transmitting a verification request from the first mobile communications device to the second mobile communications device using the decrypted application on the first mobile communications device, performing verification of a second user, transmitting the encrypted verification reply from the second mobile communications device to the first mobile communications device using the decrypted application on the first mobile communications device; decrypting the encrypted verification reply in the first secure token; verifying in the first security processor an identify of the second user From the decrypted verification reply and displaying on the first display a result of the verification of an identity of the second user.

Vectors of attacks to easily extract user's sensitive data from smartphones and other mobile devices have emerged; sourced from malware implanted locally within the smartphone or remotely through the cellular, WiFi or other communications channels.

SUMMARY OF THE INVENTION

The system and method of the present invention circumvents vulnerabilities and protects a smartphone's or other mobile device's external wireless interfaces. Rather than replace a credit card with the smartphone or other mobile device, the security architecture of the present invention employs a token tethered to a smartphone or other mobile device through an NFC channel in the mobile device. The present invention is compliant with current ISO standard NFC protocols and technology and introduces a new class of security token referred to herein as a "cryptographic module," "Crypto Module" or "CM." The CM integrates two (2) NFC antennas to parasitically power the CM. However, during the power up sensing phase, the system disables one of the crypto module NFC data communication ports to thereby establish a single trusted and isolated I/O data channel between the mobile device and CM.

Essentially, implementing NFC in this unique configuration allows a separate hardware based crypto module to be securely linked to a commercial smartphone without embedding custom hardware. The smartphone/CM are paired to each other below the mobile device (smartphone) operating system via NFC. The smartphone/CM solution secures applications, protect sensitive user data, firewalls trusted workspaces, and isolates smartphone peripherals from unauthorized access and pernicious attacks.

In a preferred embodiment, the present invention is a system for overlaying security to the baseband NFC communication layers of the smartphone to establish a hardware-based root of trust or hardware trusted execution environment using the CM.

In a preferred embodiment, the present invention comprises a cryptographic security token having a secure microprocessor, a secure bus connected to said secure microprocessor, a bus isolation microcontroller connected to said secure bus wherein said bus isolation microcontroller comprises firmware for controlling communications through said secure bus to said secure microprocessor, a first NFC antenna connected to said bus isolation microcontroller, and a second NFC antenna connected to said secure microprocessor. The secure microprocessor and said bus isolation microprocessor are powered by energy received through said first NFC antenna and said second NFC antenna. The cryptographic security token receives data from outside said cryptographic security token only through said first NFC antenna.

The cryptographic security token may further comprise a bi-state or bi-stable display and a second secure bus between the display and the secure microprocessor. The second secure bus has fully programmable irreversible bit mapping of an order between a least significant bit and a most significant bit within a data address and provides unique data addressing of data being transmitted from the secure processor to the display. The irreversible bit mapping may comprise fusible links or means.

The cryptographic security token may further comprise a secure memory and another secure bus between the secure memory and the secure microprocessor, wherein the second secure bus has fully programmable irreversible bit mapping of an order between a least significant bit and a most significant bit within a data address and provides unique data addressing of data being transmitted from the secure processor to the display.

The cryptographic security token may further comprise energy harvesters connected to said first and said second NFC antennas.

The secure microprocessor, said secure bus, and said bus isolation microcontroller are formed on a thin film printed circuit board and may further comprise an epoxy-based conformal coating over said thin film printed circuit board. The conformal layer may have properties that block probing using X-rays, focused electron and ion beam scanning and scanning electron microscopy. In another embodiment, the conformal layer comprises a potting material comprising at least one material selected from the group of urethane, epoxy and ceramic; a compound mixed within said potting material; a mineral; and an anti-tamper film embedded within said potting material. The compound comprises one or more of metals, heavy metals, graphone, carbon, carbon fullerene structures, synthetic diamond dust and quantum dots. The anti-tamper film comprises an active or passive anti-tamper mesh film. In yet another embodiment, the conformal layer comprises an ultraviolet epoxy and a compound for preventing removal of the conformal layer with acid or etching techniques without damaging any portion of the underlying printed circuit board. The compound may comprise one or more shielding components selected from the group of ground metal compounds, graphene, carbon nanotubes, synthetic diamond and quantum dots.

The cryptographic security token may further comprise a UV cured adhesive material over said conformal coating.

The cryptographic security token may further comprise a waterproof synthetic printing medium over said UV cured adhesive material, wherein polyolefin hydrophilic properties of the waterproof synthetic printing medium are custom infused with micro-taggants that fluoresce or leach die when probed.

The cryptographic security token may be the in the form of a card or in some other form.

In another embodiment, the cryptographic security token further comprises a voltage glitch detector for detecting power pulses in said security token. The voltage glitch detector comprises a comparator connected to a power bus in said cryptographic security token and to a reference voltage.

In yet another embodiment, the cryptographic security token may further comprise a secure memory; and an over/under temperature sensor and detector circuit for monitoring a temperature of said secure memory.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
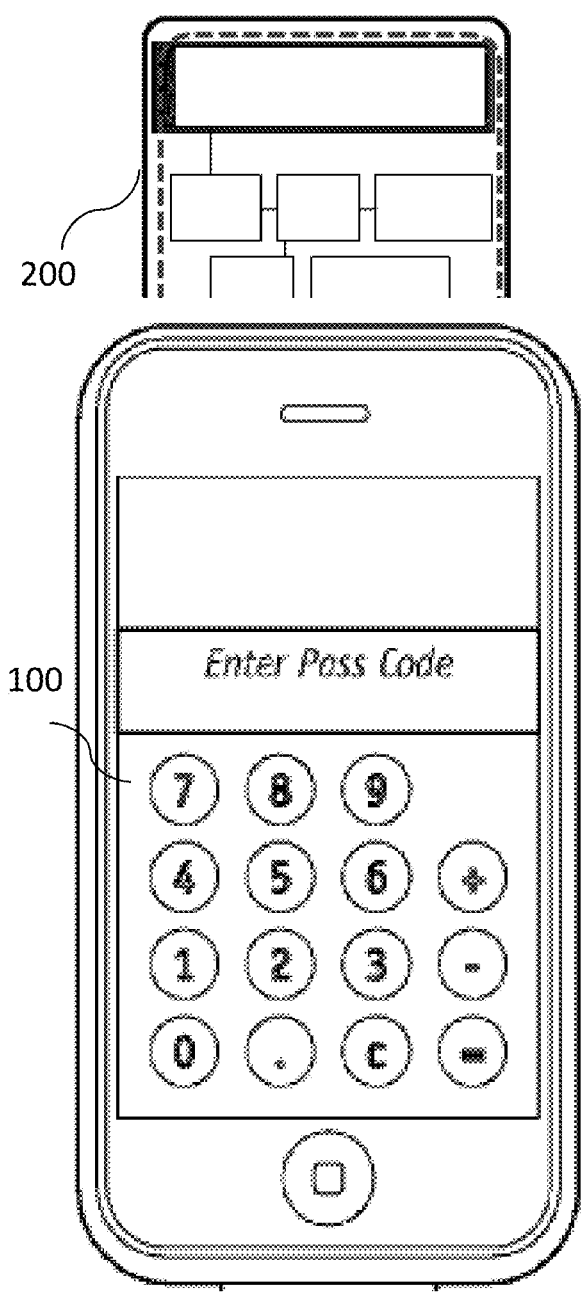
FIG. 1 is a front view of a cryptographic module and mobile device in accordance with a preferred embodiment of the present invention.

The preferred embodiments of the inventions are described with reference to the drawings. A typical operational configuration between a smartphone 100 and a crypto module 200 is shown in FIG. 1. Smartphone vendors embed the NFC antenna in various locations inside the back (non-metallic) cover. A simple sleeve is sometimes added to guide and align crypto module 200 inductive antenna coil with the smartphone antenna.

The present invention provides a localized security architecture for a smartphone based upon an NFC crypto module. The crypto module is the hardware trust anchor when connected to a smartphone. A layered approach is presented providing a defense-in-depth (DID) solution.

The software/firmware layered around the CM that address most threats and vulnerabilities is described with reference to FIG. 2. For clarity, we define the localized security ontology envisioned as a plurality of security layers. Each security layer encompasses one or more security attributes, services, or functions in the system. The layered design provides defense-in-depth protection even against National State level of attacks with knowledge and equipment resources.

Figure 2:
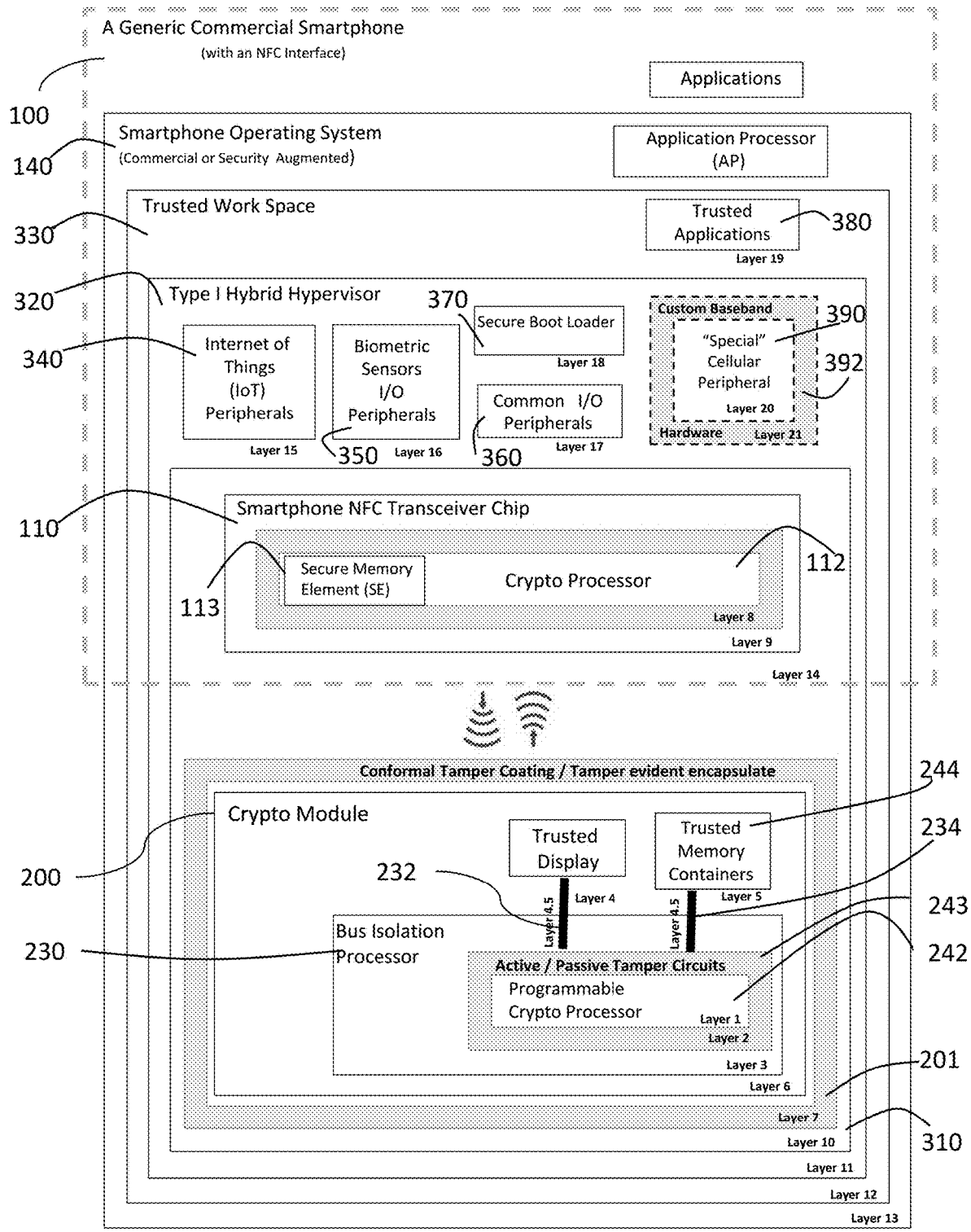
FIG. 2 is a diagram illustrating multiple layers of security provided by embodiments of the present invention.

FIG. 2 illustrates multiple layers of security:
Layer 1: The Programmable Crypto Processor (242);
Layer 2: Active/Passive Tamper Circuitry in the Crypto Processor IC (243);
Layer 3: Bus Isolation Processor (230);
Layer 4: Trusted CM Display (260);
Layer 4.5 Trusted buses (232, 243);
Layer 5: Trusted Memory Containers (244);
Layer 6: Crypto Module (200);
Layer 7: Anti Tamper/Tamper Evident CM Encapsulation (201);
Layer 8: Crypto Processor/Secure Element in Smartphone (112);
Layer 9: Smartphone NFC Transceiver Chip (110);
Layer 10: Encrypted NFC Channel (310);
Layer 11: Type 1 Hybrid Hypervisor (320);
Layer 12: Trusted Work Space (330);
Layer 13: Smartphone OS (140);
Layer 14 Commercial Smartphone (100);
Layer 15: Internet of Things (IoT) Peripherals (340);
Layer 16: Biometric Sensors I/O Peripherals (350);
Layer 17: Generic I/O Peripherals (360);
Layer 18: Secure Boot Loader (370);
Layer 19: Trusted Applications (380); and
Layers 20-21: Custom Baseband Cellular Peripheral (390, 392).

The present invention relates specifically to the cryptographic module or token and thus to specific ones of these layers of security, more specifically, Layer 1 (The Programmable Crypto Processor), Layer 2 (Active/Passive Tamper Circuitry in the Crypto Processor IC; Layer 3 (Bus Isolation Microprocessor); Layer 4 (Trusted CM Display); Layer 4.5 (Trusted Buses), Layer 6 (Crypto Module) and Layer 7 (Anti Tamper. Tamper Evident CM Encapsulation).

Layer 1: The Programmable Crypto Processor

The fully programmable cryptographic processor (242) is a separate integrated circuit (IC) within the CM. This chip 242 executes all the most trusted cryptographic functions. With an embedded general-purpose 8051 microprocessors, it also integrates three (3) math co-processors for single command execution of Elliptic Curves, AES, and 3DES algorithms. The crypto processor includes over 100 layers of security, examples of which are shown below in Table 1.

TABLE 1

Security Features in CM Cryptographic Processor

Physical Unclonable Function as next-level security feature for advanced key Counterfeit protection of hardware and software for integrity and Anti-cloning Low-power True Random Number Generator (TRNG) in hardware, AIS-31 Enhanced security sensors including Low/high Temperature sensor, Low/high SPA and DPA countermeasures from Cryptography Research Incorporated Secure Fetch Technology significantly enhances the chip hardware security for a Very dense submicron 5-metal-layer 0.14 μm technology Glue logic and active shielding technology Dedicated HW measures to protect against any kind of leakage attacks The Math X.509 certificate based client authentication application pre-installed
Delivered with pre-programmed transport keys, die-specific keys and The master keys are securely stored in Trusted Memory Containers on chip Robust cryptographic core, countermeasures and protection of device assets Secure generation and insertion of key and certificate data, individualized for each die Secure Fetch Technology, protecting code fetches from ROM, RAM and Dedicated security CPU designed in asynchronous handshaking circuit Dedicated Test Software (Test ROM Software) in the Test-ROM of the Target of Control of operation conditions to provide correct operation in the specified range Basic arithmetic functions for large integer numbers for the calculations of the public Filtering of power supply and clock input as well as monitoring of power supply, the Protect against Inherent Information leakage via physical probing
Protection against Malfunctions (Security Fault Resilient)
Protection against Physical Manipulation
Protection against Forced Information Leakage
Protection against Abuse of Functionality
Protection against data disclosure by physical probing when stored or while being Dedicated shielding techniques for different components and specific encryption
Use of electronic fuses ensures the secure storage of configuration-and calibration Layer 2: Active/Passive Tamper Circuitry of the Crypto Processor Chip As described in Table 1, the crypto processor chip 242 has both active, passive, and design layout features that protect the functions and data contents of the cryptographic processor chip. Active tamper sensors in the CM are only powered when the CM is powered by the smartphone. When power is removed from the CM the crypto processor sensitive data stored within volatile memory is removed through known means for wiping data in volatile memory.

Layer 3: Bus Isolation Processor

The primary function of employing a separate bus processor 230 embedded within the CM is to isolate and secure the internal bus from outside access from intentional intrusion. The security functionality of the Bus Isolation processor chip 230 is detailed in the next two sections. It is an important function to switch the NFC bus control from the smartphone to the CM and to physically isolate the vulnerable data bus within the CM from access by the smartphone and outside world.

Layer 4: Trusted CM Display

The crypto module has been designed with its own separate secure display 260, referred to herein as a "trusted display." It is typical of most secure CM operations that eight or more individual security functions (i.e. unlocking a trusted smartphone app) are executed in series. Consequently, status, intermediate results, alerts, interrupts, and prompts all are displayed on the trusted CM display.

Not only does the trusted display 260 provide user feedback while secure processes are being executed but also it provides instant notices if any attacks or policy breaches occur. For example, if a data breach attempt by a hacker occurs in the hardware/firmware of the crypto module, the display will automatically generate a message. The crypto module can actively respond to a data breach by terminating all trusted processes, make sure that any unprotected private data is encrypted and stored, erase unprotected keys, and block any further requests for trusted processes. In essence, the trusted display provides feedback to the user of a tamper event.

A second value of the trusted display 260 is the ability to confirm a trusted CM operation was completed—meaning the CM is capable of performing atomic operations, i.e., a single function at one instance in time with no other software thread running such that no other temporary registers are being used by other functions and the heap and stack registers (which keep track of the jumping pointers) are only being accessed that that single function. In other words, during the process the trusted display is designated to show just the intermediate results and no other application can interrupt. With the trusted CM display 260 any given cryptographic operation is guaranteed to run to completion and the intermediate results of a primitive operation cannot be modified.

The main security advantage of the bi-stable display technology is that once the elecrophoretic pixels are changed, they remain in this position and the contents created on the display remain in place without any external power supply (i.e. the smartphone). At the same time, visible information on the trusted display 260 can neither be deleted nor manipulated from outside. Additional power is only needed to write new display contents and this is only possible through commands from the crypto processor within the CM.

Another unique security advantage of the bi-stable segmented trusted display 260 on the crypto module 200 is the capability to eliminate or replace the need to print the user's name, role, card expiration data, and even photo on the outside of the card. Removing sensitive printed data on the card and storing it electronically inside the CM 200 makes it significantly more challenging for an adversary to counterfeit the CM.

Furthermore, the user's electronically stored role, access privileges, and time-bounded access information can be scrolled on the segmented display to provide the verifier more granular data. Scrolling data on the segmented CM display 260 can provide any type of more detailed sensitive user data without exposing the data by printing it on the card. This type of data includes, social security number, date of birth, blood type, rank in military, country of citizenship, immunizations, special access privileges, vehicle registration, and more.

Another unique security advantage of the bi-state segmented trusted display 260 on the CM 200 is to show the specific photo files decrypted and forwarded to the smartphone verifier. In this use case, a file containing a sequence of portraits of the CM owner at various angles, or even video scenes can be forwarded to the verifier's smartphone device. This "video Identification on card" technology means that no sensitive biometric data has to be transferred to an external document verification device without that entity being approved by the CM owner.

Yet another feature of the CM display 260 is for use in eID applications. One-Time-Passwords (OTP) can improve the security of transaction-based on-line sessions. CM display 260 can facilitate a Secure Password Protected Authentication Channel (SPAC). The use of an optical channel implemented by a flexible display for secure password transmission in combination with a cryptographic procedure is now feasible. The CM trusted display 260 in this use-case acts as security-enforcement component to establish secure and authenticated radio frequency communications between the NFC CM and smartphone.

Layer 4.5: Customized Data Bus Between Crypto Processor and Trusted Display/Memory In FIGS. 2 and 3A another security feature of the crypto module is a custom data bus between the cryptographic processor (242) and trusted memory (232) and trusted display (234). Sensitive data is transferred between these components on the Printed Circuit Board (PCB) that are potentially vulnerable to probing attacks. Probing can be either physical using microprobes or with non-intrusive imaging tools such as X-Ray/Terahertz microscopy, SIM, or ion and electron beam equipment.

Countermeasures to protect these two data buses on the PCB include the Conformal Tamper coating detailed in Layer 7 (201). In addition, these two data busses (232, 234) are customized using three (3) novel techniques.

First, the buses between the trusted memory (234) chip/trusted display (234) driver chip and the secure cryptographic microprocessor chip (242) is fully programmable to bit mapping of an order between a least significant bit and a most significant bit. This is a one-time, irreversible, and unique for each crypto module. The advantage of uniquely customizing the order of each data bit to each crypto module (200), requires the hacker to expend significantly more time is to probe and extract meaningful data. Moreover, automated software tools cannot be employed.

Second, all circuitry used to transmit data across the bus employs complimentary logic using a redundant 2-wire (dual rail) design. The purpose of this design reduces the small variations and glitches induced on the supply power supplies when transmitting the data. Obfuscation of the transmitted data makes it significantly more challenging for an adversary to identify and extract data being transmitted between integrated circuit components. This defensive technology uses self-timed dual-rail logic. In dual-rail logic, a '0' or '1' is signaled not by a low or high voltage on a single wire, but by a combination of signals on a pair of wires. For example, '0' may be 'LH' and '1' may be 'HL'. When used in self-timed circuits, 'LL' signals quiescence. Another advantage of dual-rail encoding is reduced data dependent power consumption as all states have the same Hamming weight. Dual-rail encoding is not sufficient to guarantee a data independent power signature. The path taken by each wire could vary resulting in different wire load. Yet another attribute of the dual rail bus design is to allow reliable propagation of the tamper alarm signal from tamper film of Layer 7 (201) to the crypto processor (242).

Third, the custom data buses (232, 234) also integrate a check sum or error correction circuitry on the dual-rail design. If data errors are serendipitously injected into the bus by a hacker, the check sum logic can detect and self-correct these injected bits. An inherent drawback of the dual rail design is fragility: bugs tend to cause the emergence of the unwanted 'HH' state, which propagates rapidly throughout the circuit and locks it. Implementation of the customized check sum/error correction circuitry reduces the sensitivity that single data bit failure is likely to cause the output of sensitive information.

Layer 6: Crypto Module

The fundamental role of the CM 200 is to provide an independent isolation trusted processing environment outside the smartphone. The CM 200 achieves this in two ways. First, the hardware design prevents access to or monitoring of the internal operations of both token and smartphone. Second, the CM secure cryptographic functions executed within the CM never expose or exports critical data like private keys, user authentication data, trusted processing results, or other like data.

The crypto module 200 defines a standardized isolation environment linked to a commercial smartphone in which security software/firmware code, data and resources are processed outside from the main operating environment, software, and memory in the smartphone.

The security functionality of the crypto module is detailed below.

Layer 7: Anti Tamper/Tamper Evident CM Encapsulation

Because the crypto module 200 is a system comprised of many chips and a display, the encapsulation material around the CM is protected against tampering. Most vulnerable to attack are physical probing or indirect probing to extract data off the internal data busses, memory, or IC's.

Anti-tamper technologies to protecting a single integrated circuit to withstand multi-million-dollar attacks have evolved to protect intellectual property and reduce the potential attack surface. Many chips now implement non-standard attack-resistant logic styles, protective mesh layers, passive tamper resistive tamper evident, and active attack sensors. An effective anti-tamper solution encapsulating the entire printed circuit board (PCB) has not emerged against non-invasive and semi-invasive analysis techniques. The layer 7 encapsulation provides the structure and method for this method.

The most effective way to secure the CM 200 is to include multiple levels of security features to each encapsulation layer. The crypto module encapsulation layers include a conforming anti-tamper potting material, UV cured binding adhesive, and Teslin with extruded tamper taggants, customized covert and/or forensic security inks, and polyester top lamination. Each lamination layer incorporates one or more anti-tamper security features.

The first layer of tamper protection on the CM is a conformal tamper thin film coating printed over the front and obverse sides of the Printed Circuit Board (PCB) using UV/Visible light to help streamline the curing processing. The objective of the conformal coating is to achieve a higher anti-tamper (AT) level of protection without compromising circuit performance. The use of AT technologies prevents or slows an adversary's attacks by increasing the time it takes for them to reverse engineer and design a counter to the system.

The first tamper layer is a hard opaque potting material encapsulation of multiple chip circuitry CM or strong opaque on front and obverse side of the PCB with removal/penetration attempts causing serious damage.

The first encapsulation tamper layer base is comprised from urethane (provides a hard, durable potting coating that offers excellent abrasion and solvent resistance), epoxy (excellent resistance to moisture and solvents, consisting of a two-part thermosetting resin), or ceramics (thermal spray that shields direct access to PCB). It is opaque and resists solvents, heat, grinding, and other techniques that have been developed for reverse engineering.

Other tamper compounds are mixed within the base material to protect against micro-probing attacks. Compounds mixed within the base urethane, epoxy, or ceramic potting material are design to not only shield electromagnetic emissions but also block outside electromagnetic micro-probing. These compounds can etch or automatically destroy the underlying components on the crypto module circuitry when an attempt is made chemically to break through the protective layer.

Various compounds mixed within the opaque potting material are specifically designed to shield against different types and instruments used in probing attacks. These compound materials and esoteric combination of materials include;

ground metal compounds—reduced the effectiveness of remotely resetting/setting security fuses or memory by UV light or visible light. These metal compounds mixed with the potting material effectively shield attacks from Voltage contrast Scanning Electronic Microscopy tools.

Graphene—has extraordinary properties as an electronic conductor, thus greatly reducing the effectiveness of probing with electron ion beam and Focused Ion Beam (FIB) probes.

Carbon nanotubes, Carbon allotropes, carbon buckypaper film, and carbon fullerene structures include other spherical, ellipsoidal and tubular shapes, all of which capture and electrons from the focused electron and ion beam utilization tools.

Synthetic Diamond in ground or sheet form which shield electrons from penetrating while providing a hard mechanical substrate which destroys underlying CM circuitry when potting material is chemically removed. Synthetic diamond can also help shield from tools such as Focused Ion Beam machines that can ballistically, dislodge, or sputter electrons on the surface of IC substrate.

Quantum dots are minute semiconductor crystals that favorably change the optical properties that are governed by the size. The size alone of the crystal fine-tune the photon absorption or emission spectra without requiring a complicated change of material composition or stoichiometry. This becomes important shifting (stoichiometry) frequency of probes used to exact data like x-ray, laser voltage, Scanning Electronic Microscope (SEM), and UV scanning machines to the light frequencies that the on-chip silicon light sensors can detect and match the bandgap of silicon.

A tamper mesh acts as a continuously powered sensor in which all the paths are continuously monitored for interruptions and short-circuit. For the multichip crypto module PCB, the mesh covers all the sensitive components of the crypto module object and the data busses. The active tamper detection hardware circuitry is located within the cryptographic processor (242).

The tamper mesh film is the only active tamper element of the Conformal Tamper Coating/Tamper evident encapsulate (201). Since there is no internal battery embedded with to the crypto module, tamper detection is only active when the CM is powered parasitically by the smartphone. However, when combined with the passive potting material infused with other compounds, the conformal coating achieves significant countermeasures to attacks and probing.

This described security layer extends the protective boundary from the cryptographic processor anti-tamper layer (243) to the entire thin film cryptographic module (201). Extending the tamper boundary provides robust protection to the data buses (232, 234) connecting the chips within the crypto module.

The tamper mesh film embedded within the potting material of the conformal tamper coating integrates electronic sensing and detectors that are processed with circuitry inside the crypto processor (242). The type of sensors includes:

Continuity Mesh Sensor—a mesh of thin conductive traces in the film provide anti-probing barrier to the crypto module. When the mechanical probe penetrates through the mesh, a conductive trace is broken which the detection circuitry can detect a continuity change.

Power—Glitch Sensor and/or internal clock Manipulation—Fast signals of various kinds may reset data or cause program being executed within the cryptographic processors to jump or skip instructions if the power glitches are applied at the precise time. The program counter is already incremented automatically during every instruction cycle and used to read the next address, which makes it an ideal vector of attack if the adversary can generate a condition to change the counter externally by applying a short high voltage or current spike. The power glitch sensor and circuitry protect against these attacks.

Under voltage/Over voltage Sensors—Non-invasive attacks include playing around supply voltage and clock signal. Under-Voltage and Over-Voltage attacks could be used to disable protection circuit or force the processors to do wrong operation. For these reasons, voltage detection circuit is needed to prevent nefarious manipulation of data within the crypto module.

Anti SPA & DPA Sensor and Circuitry—Simple Power Analysis (SPA) and Differential Power Analysis (DPA) are attacks which extract data from probing the power supplies of the target circuitry. They measure the small variations in current and voltage coupled these DC supplies signals. The minute capacitance and resistance generated by the switching logic have been observed and correlated to sensitive data being executed within chips and transferred between chips. One of the more susceptible components within the crypto module is the data buses between the crypto processor and trusted display/memory. Drivers on the address and data bus often consist of up to a dozen parallel inverters per bit, each driving a large capacitive load. They cause a significant power-supply short circuit during any transition. Changing a single bus line from 0 to 1 or vice versa can contribute in the order of 0.5-1 mA to the total current at the right time after the clock edge, such that a 12-bit ADC is sufficient to estimate the number of bus bits that change at a time. The RF power coupling, the internal voltage regulators, and the conformal coating prevent access to the power supplies needed for SPA and DPA attacks.

Light Sensor—Many non-evasive machines like x-ray, scanning electron microscopy, and focused electron and ion beam utilization use wavelengths of light similar to a silicon detector. Placing these sensors within the conformal layer in combination with some heavy metal elements like neodymium (a soft silvery metal) provides the ability to stop the higher x-ray frequencies at the same time converting to lower frequency ions that are detectable by the silicon sensor. A simple low cost silicon light sensor combine with the proper compounds can detect and prevent attacks from advanced circuit imaging equipment.

Temperature Sensors—There are several attacks that a hacker externally and non-evasively chills the circuit forcing small charges that define and retain the value of a memory cell even when power is removed. A temperature sensor in the conformal tamper coating (201) processed within the crypto processor (242) counters this attack. Cooling memory to extract data is called data remanence. This is the capability of volatile memory to retain information stored in it for some period of time after power was disconnected. Static RAM contained the same key for a long period of time could reveal it on next power on. Other possible way is to 'freeze' state of the memory cell by applying low temperature to the device. In this case static RAM could retain information for several minutes at −20° C. or even hours at lower temperature.

The encapsulation layer (201) provides detection of direct mechanical and electronic probing activities that are intended to extract the data within the CM. The conformal tamper coating provides resistance from attacks using, x-ray, scanning electron microscopy, and focused electron and ion beam utilization. In addition, this tamper layer also provides indirect reverse engineering attacks. An example is a simple power analysis; in which a device's low-level self-radiated energy is sensed and analyzed, thus giving insight to the operation of that electronic component. The conformal coating will block this type of attack.

The core card body of the CM also employs multi-layered composite of materials and techniques to deliver greater security and functionality. This core card body material being made from a synthetic material called Teslin™. Robust anti-counterfeit, tamper-evident properties of Teslin are provided by polyolefin hydrophilic properties of the material that are custom infused with micro-taggants that fluoresce or leach die when probed. The lamination layers are designed such that physical tamper resistive layers will destroy the circuitry if removed.

Combined the covert features embedded into lamination substrate, the core card body can be verified through quick visual inspection using simple equipment such as ultraviolet (UV) flashlights and infrared (IR) pens if any tamper has occurred. The UV taggants are easily distinguished as a unique optical "fingerprint," and because they are easily discernable on the edge of a card. IR tangents provide additional authentication options with enhanced readers. Embedded UV and IR security markers cannot be replicated by copy machines or print processes.

The System Environment

Figure 3A:
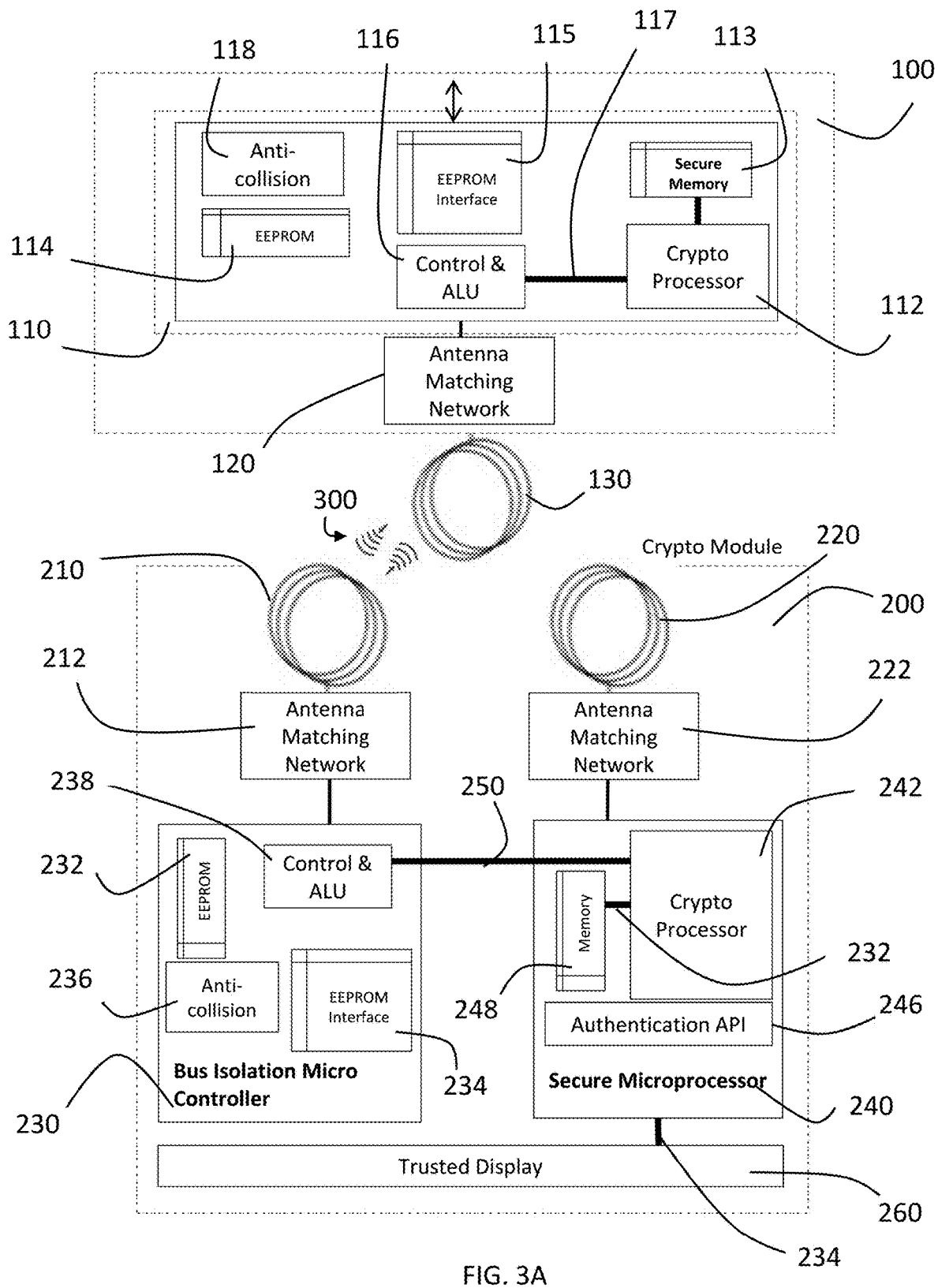
FIG. 3A is a block diagram of a system having a cryptographic module and a mobile device in accordance with a preferred embodiment of the present invention.

As shown in FIG. 3A, the present invention provides a cryptographic module or Crypto Module 200 for use with a commercial smartphone over the NFC channel in the smartphone. The Crypto Module includes a separate cryptographic processor 242 in the crypto module 200 that is complimentary and compatible with the smartphone cryptographic processor 112. The CM cryptographic processor 242 integrates a programmable cryptographic library of algorithms.

In addition, most vendors NFC transceiver chips incorporate both a programmable hardware processor 116 and secured memory 113. The secured memory 113 can store symmetric or asymmetric cryptographic keys for the NFC channel encryption or sensitive user data like credit card data, public key splits, or other sensitive user data.

Encapsulated messages between the Crypto Module and smartphone are encrypted so that even if intercepted, no content can be extracted. The standard NFC message encapsulation format for information exchange is NFC Data Exchange Format or NDEF. It is a binary message format for exchange of application payloads of any type and size within a single message. A type, a length, an optional identifier, describes a payload. Possible types are URIs, MIME media types and NFC-specific types. The optional identifier may be used to handle multiple payloads, and cross-reference between them. Payloads may include nested messages or chains of linked chunks with unknown length at the time the data is generated. NDEF is only a message format and keeps no knowledge of connections or logical circuits.

As shown in FIG. 3A, a commercially available mobile device 100 such as a cell phone typically will have an NFC baseband chip 110 having a cryptographic or secure processor 112, a secure memory 113, an EEPROM 114, an EEPROM interface 115, control and ALU processor 116, anti-collision firmware 118 and a bus 117 that provides communications between the cryptographic processor 112 and the Control and ALU 116. The mobile device 100 further has an antenna matching network 120 and an antenna 130.

A cryptographic module 200 in accordance with the present invention has a first NFC antenna 210 with an associated antenna matching network 212, a second NFC antenna 220 with an associated antenna matching network 222. The Crypto Module 200 further has a bus isolation microcontroller 230 having an EEPROM 232, an EEPROM interface 234, anti-collision firmware 236, Control and ALU processor 238 and Authentication application interface (API) 146. The Crypto Module 200 further has a secure microprocessor 240 having a cryptographic processor 242, authentication firmware and hardware 246 within the crypto processor 242 and EEPROM 248. A bus 250 provides for communications between the bus isolation microcontroller 230 and the secure processor 240. The Crypto Module 200 further includes trusted display 260.

Leveraging the hardware encryption processor 112 incorporated in the commercial smartphone transceiver chip, the crypto module architecture integrates a compatible hardware cryptographic processor 242 in the design. Shared symmetric cryptographic AES or equivalent keys are pre-stored during provisioning of the smartphone 100 and CM 200 respectively. The cryptographic key for the smartphone 100 is stored in trusted memory 113 and sometimes called the "secure element." An expandable memory (not shown) in the crypto module 200 as well as the integrated memory within the crypto processor 242 is trusted and secure. The Crypto Module memory can be parsed into separate trusted data containers during provisioning for multiple trusted applications. For example, a separate memory container can be provisioned in the crypto module to store the NFC data channel encryption key.

Utilizing the existing NFC hardware in the smartphone 100, the data traveling between the smartphone 200 on a data bus 117, through the air gap of the NFC, through the data bus 250 in the Bus Isolation Microcontroller 230, and finally to the secure processor 242 is fully bi-directional encrypted. Data in transit within the crypto module 200 is decrypted and protected by other layers of defense, for example, in the Crypto Module circuitry 260. By integrating a common security NFC protocol and compatible hardware cryptographic processors on each end of the data channel, a more effective and secure framework is provided for implementing a suite of new security functions.

Power-Up Mode

The Crypto Module 200 is designed as a hybrid device meaning it is a passive token in that it does not have a battery, yet it immediately establishes bus control upon sensing the NFC field from the active (powered) smartphone 100. The smartphone antenna design with a large (2500-4500 mamp/hour) battery typically amplifies the signal to the receiver—the crypto module. Although the minimum or maximum power value actually transmitted to the crypto module is NOT defined in the NFC standard.

The communication technology is based on magnetic field induction from an active (battery powered) device like a smartphone. A passive device like the CM 100 does not contain a battery, but rather, is parasitically powered by an induced magnetic field of the smartphone. A typical passive token is powered up when the magnetic field is strong enough to induce the needed voltage in the passive token's antenna so that its internal circuitry can operate. In this scenario, the typically passive token responds and defaults as the passive device. When activated, the typical passive token simply responds to commands sent by the active initiating device (smartphone).

The novel architecture of the present invention employs a hybrid NFC interaction between the active smartphone 100 and passive CM device 200. However, the crypto module 200 does NOT default as the passive device as a responder to the initiating smartphone 100. Rather, when sensing the induced NFC field, firmware within the CM 200 switches control of the data interface from the smartphone 100 to the CM 200. With this new hybrid NFC protocol architecture, all actions like authentication or transmitting the contents stored in memory are initialized and controlled by the crypto module 200 not the smartphone 100.

Essentially, the control of the NFC data bus is switched from the smartphone 100 to the crypto module 200. The crypto module 200, even though it's being parasitically powered by the smartphone 100, is an independent entity capable of executing one or more trusted processes.

To effectively switch the control of the NFC bus from the default smartphone 100 (that is powered) to the Crypto Module 200, two NFC antennas 210, 220 are implemented in the Crypto Module 200.

The basic Crypto Module antenna design is a square loop with approximately 3 cm sides, rounded corners and 9 turns. Layout of the metal traces and geometry comprising the CM antennas is straightforward, as they only support passive communication mode (i.e. they do not have to generate their own magnetic field like the smartphone). The present invention, however, is not limited to this antenna architecture.

The analog tuning antenna circuitry in the antenna matching networks 212, 222 does require careful tuning using discrete components to calibrate and optimize the Q-factor, the resonance frequency tuned near the 13.56 MHz carrier frequencies, and to pre-shift the carrier frequency for the materials used to encapsulate the crypto module 200 into the card form factor.

Figures 3B, 3C:
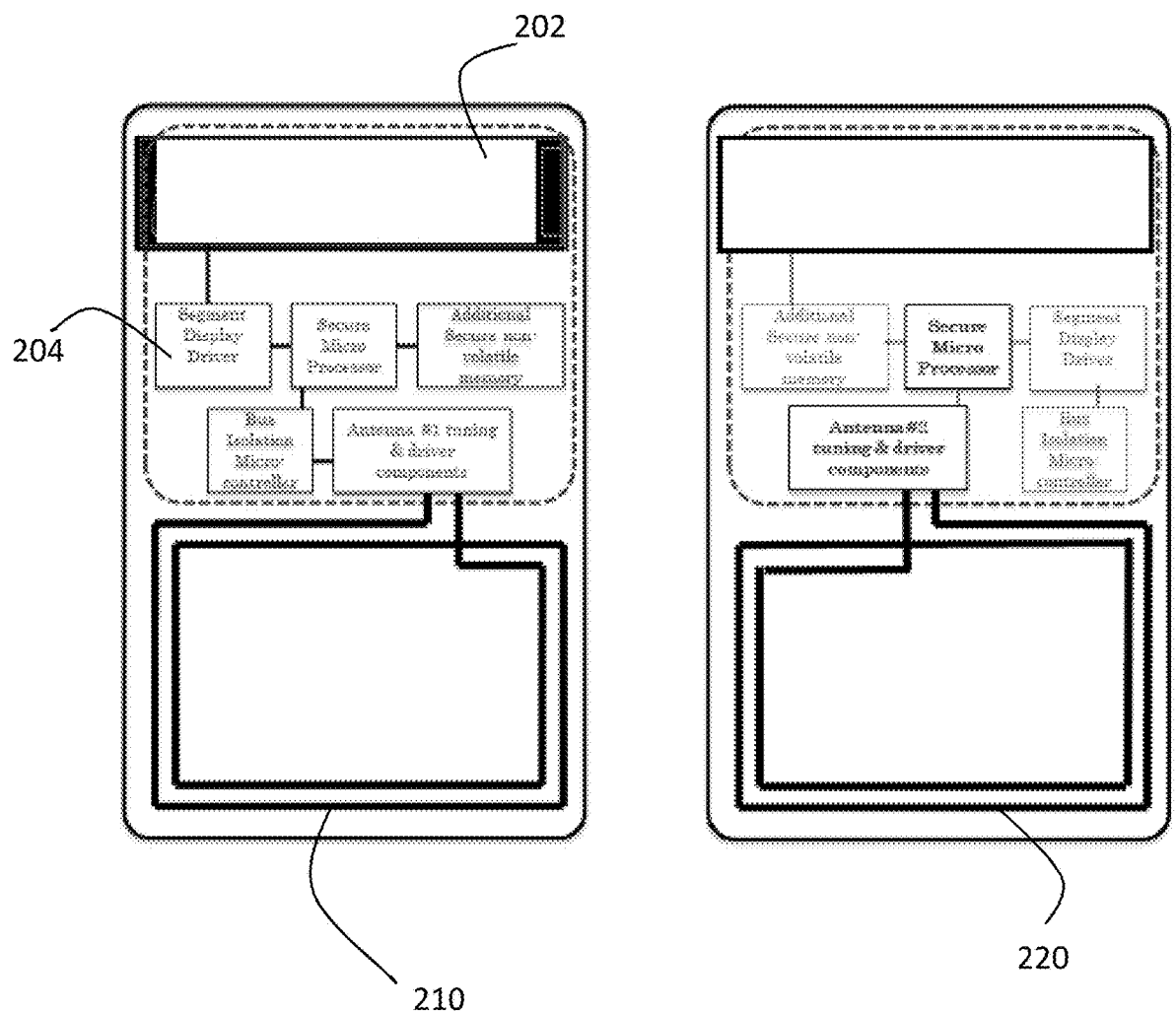
FIG. 3B is a block diagram of a front side of a cryptographic module in a card form in accordance with a preferred embodiment of the present invention.
FIG. 3C is a block diagram of an obverse or back side of a cryptographic module in a card form in accordance with a preferred embodiment of the present invention.

The two antenna design for the crypto module 200 is functionally unique for two reasons. First, the inductive power coupling mechanisms from the smartphone 100 to the Crypto Module 200 is more efficient when using two antennas. This is based on the resonant frequency, the number of turns and the effective area. Although providing a better Q-factor, the number of turns cannot be infinitely increased. Integrating a second antenna 220 on the opposite (obverse)

side of the Printed Circuit Board side (FIG. 3B) with an identical antenna 210 on the front side is effectively coupling in more power. Antenna #1 (210) and Antenna #2 (220) couple power into the Crypto Module 200 using analog circuitry in the antenna matching networks 212, 222. Placing, metal components, signal traces, or ground planes outside the two-antenna coil loops optimize the induced magnetic field power coupling further.

Tin the Crypto Module 200 power is needed to supply the bi-state display 260, display driver Integrated Circuit 204, cryptographic microprocessor 242, bus controller processor 230, analog antenna tuning and filter circuitry 212, 222, and non-volatile memory. With a maximum of 10 mamps available from the smartphone NFC antenna, a multiple antenna design on the CM side is capable of coupling in enough power.

Second, the two-antenna Crypto Module design improves security. The design provides a means to truly isolate the data and power between the smartphone 100 and a Trusted Execution Environment (TEE) required for the crypto module 200.

This TEE isolation is achieved by a novel method of using both NFC antennas 210, 220 during the initial power up sequence of the Crypto Module 200, followed by assigning the NFC data bus to antenna 210 exclusively. A separate microcontroller 230—called the "Bus Isolation Processor" or "Bus Isolation Microcontroller" is included in the Crypto Module 200 to provide physical and temporal isolation.

Figure 4:
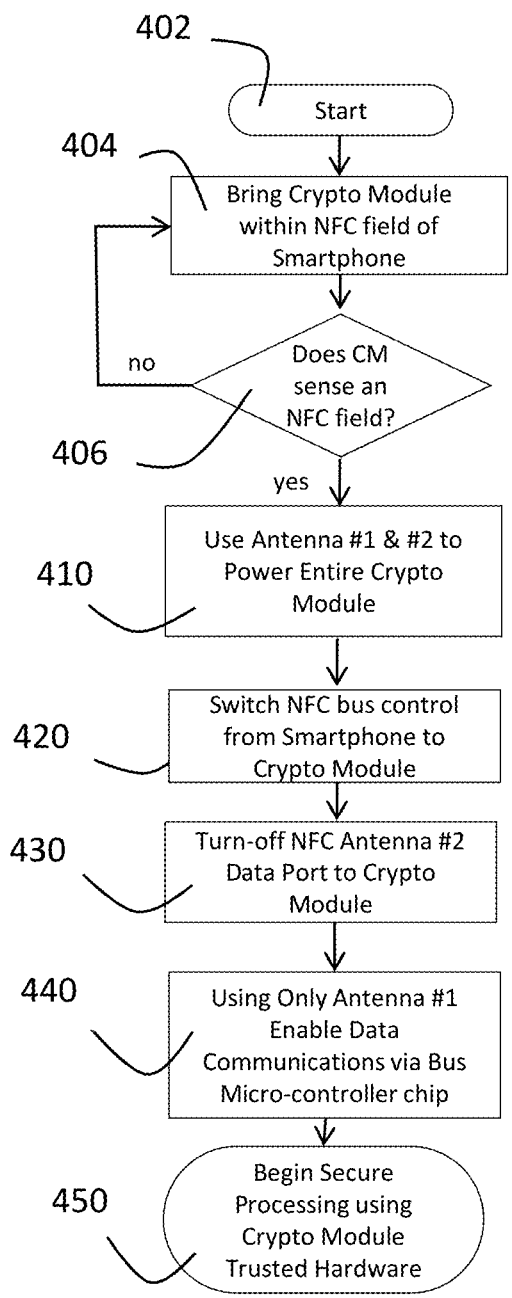
FIG. 4 is a flow chart of a power up sequence of a cryptographic module in accordance with a preferred embodiment of the present invention.

The flow diagram in FIG. 4 details the sequence of steps that isolate the Crypto Module 200 during power up. The Crypto Module 200 is powered 100% parasitically by the smartphone 100. The NFC standard assumes Reader/Writer NFC operational mode. The smartphone 100 is the active reader device since it has a battery. Likewise, in Reader/Writer mode, the crypto module 200 defaults (as defined in the ISO standard) as the passive device responding to the smartphone. Even though the NFC standard was later appended with ISO 18292, including tokens that could be internally powered, the firmware programmed into the Bus Isolation Microcontroller 230 chips will still set the CM as the Master bus device. Therefore, the flow diagram isolating the internal TEE Crypto Module data bus is still applicable. A flow diagram later in this application describes how the same security architecture works for any mode of the NFC standard.

The process begins (402) when the user brings the Crypto Module within approximately 1 cm of the smartphone (404). When the user brings the Crypto Module within approximately 1 inch to the smartphone, both the internal cryptographic processor and bus isolation processor sense an RF field (406). The Bus Isolation processor powers up faster than the cryptographic processor thus it is the first to sense any commands sent from the smartphone NFC transceiver.

Both Antenna #1 and #2 couple power to the crypto module (410). Once fully powered (420), the Bus Isolation Processor ignores the smartphone's initiator request and sends an initiator return ping request to the smartphone. The reason why the Bus Isolation Processor ignores the smartphone request is so that the CM can be established as the active or master device on the NFC bus. An acknowledge response is received back from the smartphone (thanks to the added active card ISO 18292 standard addition) and it immediately turns off the NFC data port from the second antenna to the crypto processor (430).

Note, by disabling the Crypto Module data port in NFC antenna #2 (230), it does not disable the carrier frequency of antenna #2. At this point in the process the Crypto Module is inductively powered by both Antennas #1 and #2 (410), yet the only data communications link between the smartphone and Crypto Module is through Antenna #1 (440). This subtle yet obscure sequence of steps that are fully compliant with the NFC standard. These steps allow a passive card like the CM to be parasitically powered while at the same time allowing the CM to be the master data bus controller and thereby become trusted hardware for secure processing (450).

Figure 5:
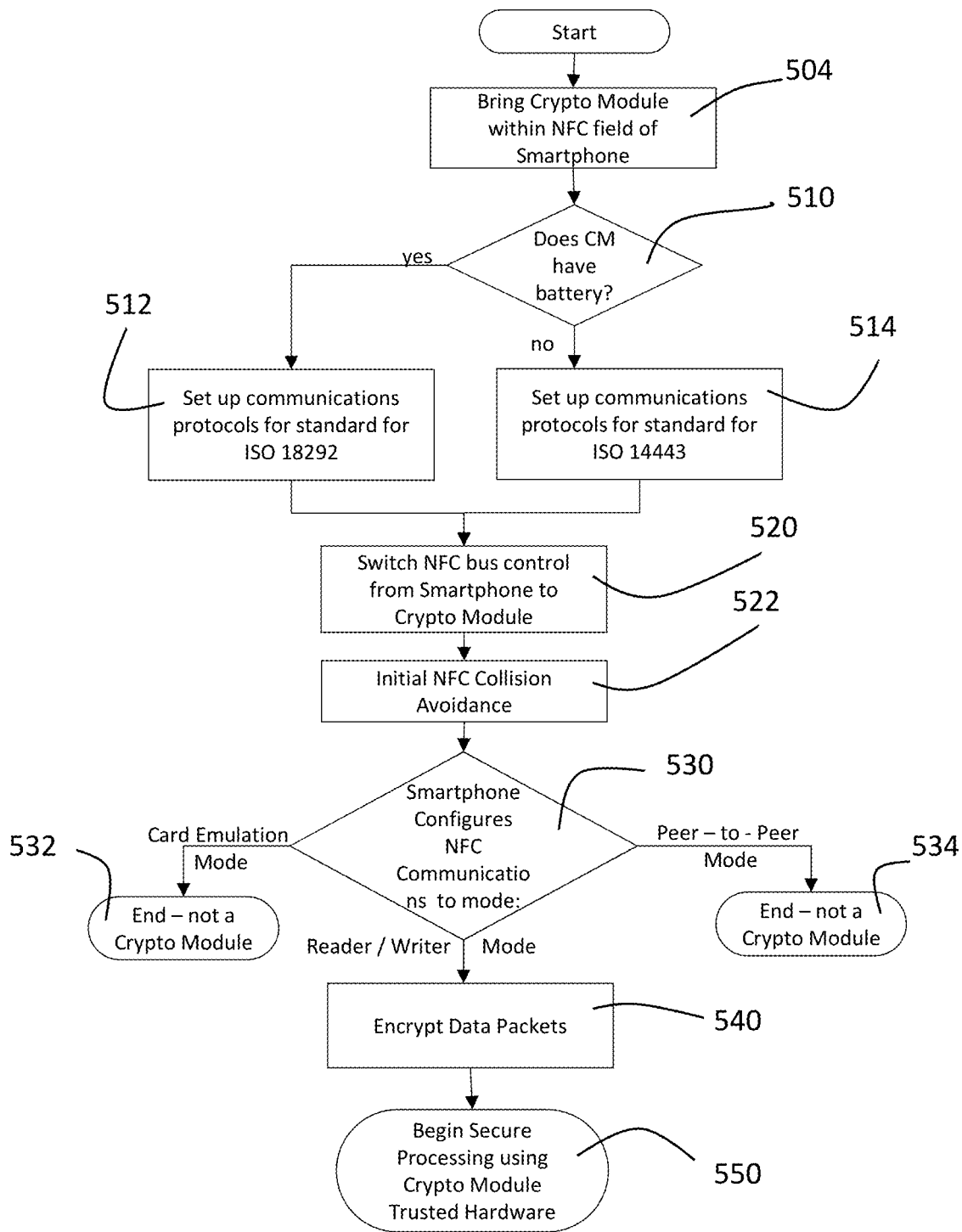
FIG. 5 is a flow chart of a method for establishing secure processing using cryptographic module trusted hardware in accordance with a preferred embodiment of the present invention.

ISO NFC standards have defined three (3) different communications modes. From the smartphone perspective, with the exception of steps 510, 520, 540 and 550 shown in FIG. 5, the power and configuration settings of the NFC connection follow the standard.

The first mode is peer-to-peer. In peer-to-peer mode, two NFC devices (i.e. smartphone #1 & smartphone #2) can exchange data such as virtual business cards. When the CM is brought within range of the smartphone (504), the NFC protocol will determine whether the CM is a batteryless token (510). Depending on whether the token is batteryless, the smartphone sets up communications under a correct ISO (512 or 514) and switch the bus control to the CM (520) and performs initial NFC collision avoidance (522). However, when the smartphone protocol attempts to configure the data channel (530) it will realize that it's in Peer-to-peer mode and terminate the communication exchange (534).

In the $2^{nd}$ mode—Card Emulation mode, data such as credit card or transit data is stored within the active powered smartphone device whereby the user's phone replaces the card itself. Following the standard NFC powering up sequence (504), the smartphone will realize that the CM does not have a battery (510), attempt to switch control to the CM (520), and configure the CM/smartphone into the Card Emulation mode (530). However, no data will be transferred from the CM to the smartphone and an end of operations command is issued (532).

The $3^{rd}$ NFC communication mode is called Reader/Write. The method of the present invention operates in the Reader/Writer mode. The Reader/Writer operational mode has duplex two-way communications and allows for battery powered or passive tokens. Following the NFC standard during the power up mode, the CM can have a battery as defined in ISO 18292 or be a passive token without a battery like ISO standard 14443. In either battery or batteryless CM case, the Crypto Module assumes control over the data bus (520). Upon completion, the data bus encrypts the channel in both directions using a pre-stored symmetric key (540). The crypto module is now securely tethered to the smartphone to proceed with any requested secure processing (550). The smartphone utilized a single NFC chip to and are fully compatible with all three communications modes.

Because of the relatively short communication range in NFC in general, little effort has traditionally been put into security analysis of such protocols. It seems that the short signal range leads people to believe that the channel cannot be tampered with. Although inherently more difficult to eavesdrop on an NFC mode compared to other smartphone interfaces, the present invention focusses on only adding security to the NFC data channel.

The NFC standard defines two modes of operation, active and passive. In passive mode the initiator generates a RF field to energize the target. In turn the target responds using a load modulation scheme on the field generated by the initiator.

In the typical card-reader smartphone NFC application, the smartphone is the active/initiator and the token is the responder or passive device powered up parasitically by the smartphone. In active mode each device generates its own RF field and modulation. The initiator sends information or commands on its field, and the responder answers on another field.

With security architecture and method of the present invention, these active/passive roles are switched between the smartphone and Cryptographic Module—without modifications of the standard NFC protocol. As the Crypto Module 200 is brought into the inductive field of the smartphone, firmware code programmed within the smartphone switches the initiator/responder roles. The standard NFC terms of "Active/Passive" role or modes become confusing. For clarification, we use the "Master device" for the active or initiator mode and "Slave Device" for the passive or responder mode.

Figure 6:
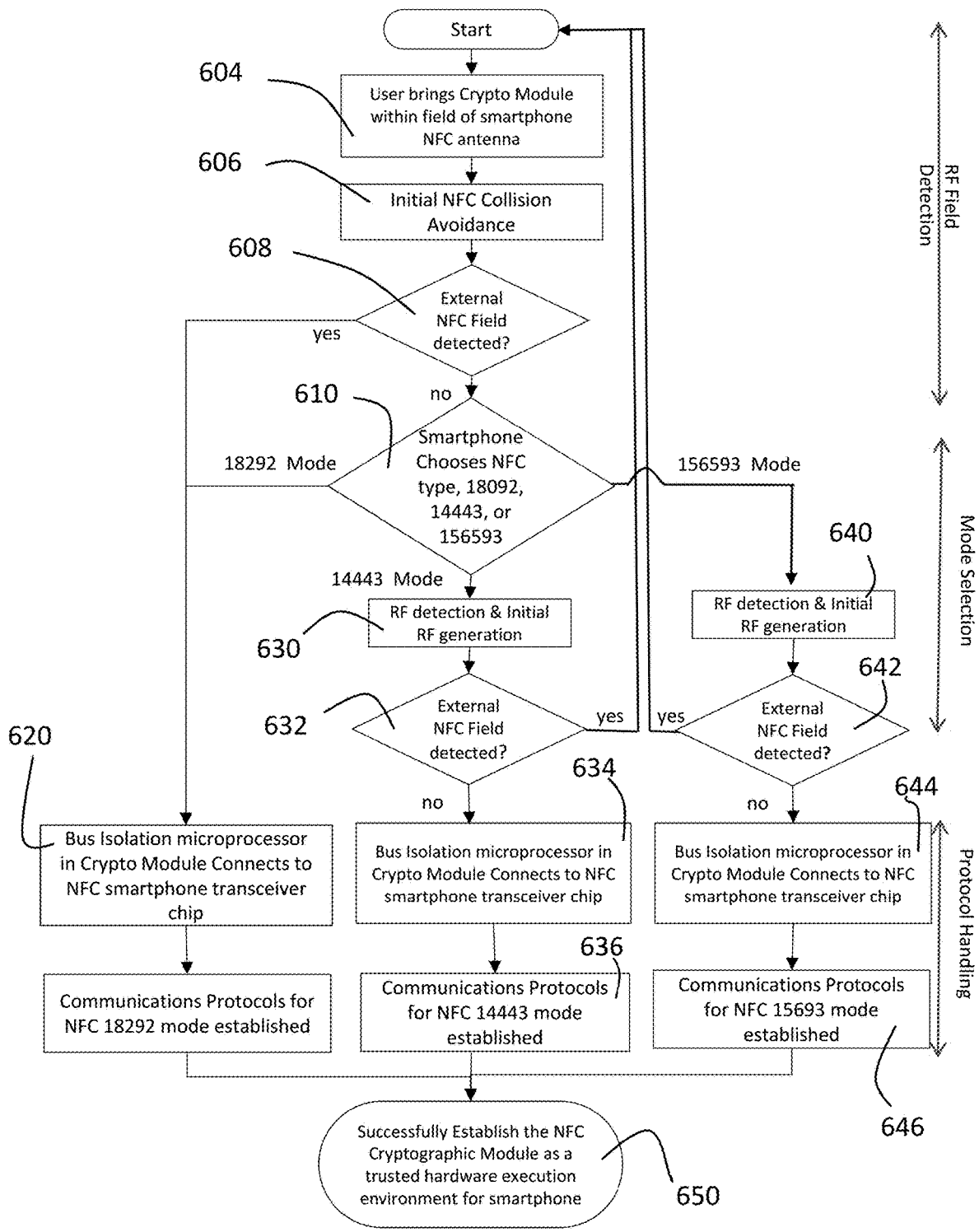
FIG. 6 is a flow chart of a method for establishing an NFC cryptographic module as a trusted hardware execution environment for a mobile device in accordance with a preferred embodiment of the present invention.

What is important to note is that, as shown in FIG. 6, the NFC initialization standards are not modified in any manner.

With the subtle initialization sequence, overall system security is greatly enhanced. Moreover, the Crypto Module serving as the master device on the NFC bus allows the Crypto Module to:

1. Be an independent and hardware based trusted and secure processing platform.
2. Physically isolate the Crypto Module processing environment from the smartphone device it's connected to. Having a secure hardware based environment enables security features never before realized such as user authentication, cryptographic key generation, over-the-air rekeying, cryptographic based unlock of smartphone apps and trusted workspaces, and independent security monitoring of the integrity of operational apps and smartphone configuration to mitigate malware.
3. Allow the Crypto Module to encrypt data or "tunnel" through an untrusted device such as a commercial smartphone to a network firewall, app store, network cryptographic key update app, or to another mobile user's cryptographic module.

In summary, this novel role change between the NFC initiator and responder has a significant affect enhancing the security to a smartphone.

The protocol flow is described with reference to FIG. 6. The NFC specification will always be the same for both initiator to target and target to initiator communication. At the lowest data transfer speed supported by NFC, the initial bit rate will be 106 kbps (fc/128) and is set by the initiator. For this bit rate, the initiator uses 100% Amplitude-shift Keying (ASK) modulation to generate pulses.

The smartphone (reader) and the crypto module (tag/token) use different modulation techniques. Testing results in practical eavesdropping attacks on NFC cards show that in general, the forward channel in ISO/IEC 14443A can be picked up at a much greater distance than the backward channel, and that the reading ranges differ according to both tag type and the test environment. Moreover, testing indicates that NFC in active communication mode is more vulnerable to eavesdropping than NFC in passive communication mode.

A security advantage of the NFC protocol implementation of the present invention is the crypto module is passive and is the defined initiator to the target smartphone device. The CM to smartphone default modulation provides inherent lower vulnerability to eavesdropping attacks.

In the typical NFC operation mode where the Master initiator is the smartphone; ASK has significantly greater reading range than the load modulated signal making it more vulnerable to malicious activity. By immediately switching NFC bus control from the smartphone to the Crypto Module, the ability of nefarious actors to skim sensitive data is significantly reduced. Using sophisticated directional skimming antenna equipment hidden in briefcases, vehicles, backpacks demonstrated up to 2 meters away in early research is no longer possible.

Yet another capability of the CM where upon power up the CM and smartphone are set into a unique operational mode in which the master and initiator is given to the CM, eavesdropping attacks on the more vulnerable ASK encoded channel is greatly reduced. With such an arrangement, a hidden skimmer antenna would have to be significantly larger, less portable, and require more power.

Yet another security capability of the CM is the ability to protect against writing of malicious content to CM using a "fake" smartphone to a validly issued CM. Even though the ASK encoded smartphone to CM channel is more susceptible to this class of attack, strong device and user authentication algorithms executed during power up prevent these exploits.

Yet another security capability of the CM is the ability to protect against replay attacks. Again, even though the ASK encoded smartphone to CM channel is more susceptible to replay attack, dynamic one time unlock keys are executed for each CM/smartphone transaction.

The NFC slave device responds to the initiator by generating a subcarrier of the 13.56 MHz carrier frequency encoded with Manchester Coding with obverse amplitude.

In FIG. 6 the initialization and communications flow diagram (RF Field Detection, Mode Selection and Protocol Handling) is shown to the right. In the RF field detection section, when user brings the CM within the field of the smartphone NFC antenna (604) the system first looks for RF collisions (606) to avoid disrupting or preventing eavesdropping to existing communications. If all clear, the Crypto Module senses the RF field (608) to always set the CM as the initiator or Master device (as previously described).

The system then goes through a mode selection process (610, 630, 632, 640, 642). Once the mode selection is completed, the Bus Isolation Microprocessor in the Crypto Module connects to the NFC smartphone transceiver chip (620, 634, 644). Finally, the system negotiates the data exchange details (626, 636, 646) like data transfer speed, packet length, authentication, and other exchange protocols and a trusted hardware execution environment is established (650).

When the smartphone is operating as a responder/slave device, the RF field generated by the initiator typically (as defined by the standard) cannot be switched off during a transaction. However, our NFC operational model does not have its own power supply or battery in the Crypto Module. Therefore, when a second NFC device is sensed within the field, the protocol cannot identify or handle additional modulation signals within the field. A data collision will be detected, and testing has shown the bus becomes disabled. The NFC collision avoidance protocol simply does not work. From a security perspective, we characterize this as either a flooding, relay, or eavesdropping attacks even though the first NFC channel is encrypted.

The full NFC protocol standard is slightly more complicated since there are three different contactless close-coupling communications modes at 13.56 MHz, namely ISO 14443a, ISO 14443b, and ISO 15593. Although not yet tested, the collision avoidance initializations protocols should result with the same outcome of flooding or denial of service attacks to disrupting the first active NFC information exchange between the Crypto Module and smartphone.

From a security perspective, the Crypto Module connected to the smartphone has several unique capabilities including;
1. The ability to encrypt data through the smartphone to a network server to another CM at a second user's endpoint.
2. The ability to operate as an isolated trusted device performing and display results of one or more secure processes.
3. The capability to act as an independent hardware device to boot-up, configure, and/or constantly monitor smartphone functions.
4. Store and manipulate sensitive data and cryptographic keys without exposure to data outside the CM The present invention provides a method to expand the hardware within a smartphone that is susceptible to attack with a robust hardware trust anchor called the Crypto Module. The hub and spoke architecture that has evolved in smartphones where the core application processor (hub) is directly connected to memory, touch screen, applications, and the outside world through a plethora of peripherals with antenna has been exceptionally challenging to secure.

The crypto module of the present invention is a processing, storing, and displaying apparatus, which executes security functions within a trusted isolated environment to notably overcome these security challenges.

Figure 7:
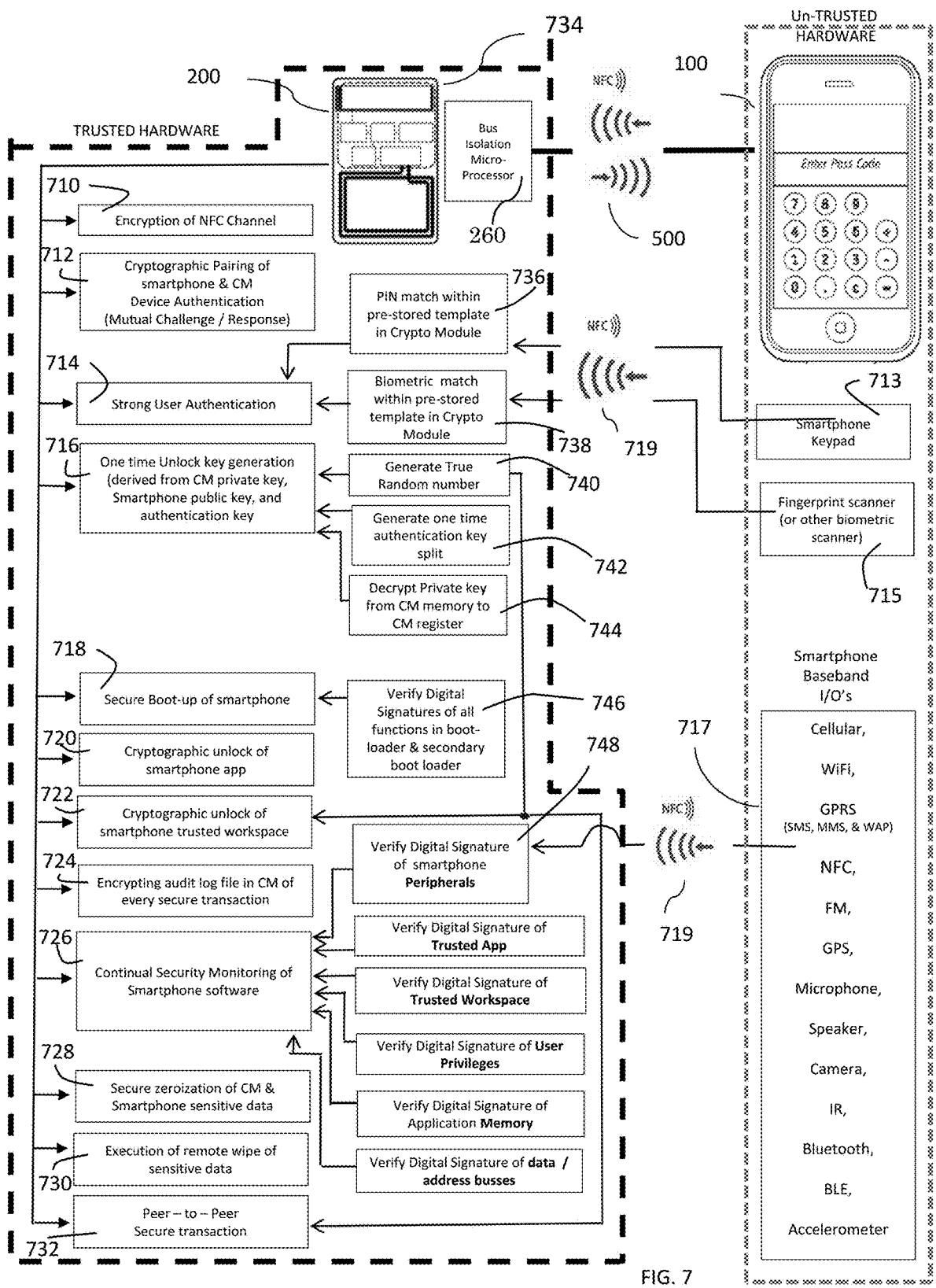
FIG. 7 is a block diagram illustrating exemplary processing steps or applications that may be performed using a trusted hardware execution environment in accordance with a preferred embodiment of the present invention.

One important element of this patent is the ability of the CM to execute critical trusted cryptographic functions in an isolated separate environment. As shown in FIG. 7, seventeen (17) trusted functions (710-746) have all been codified within the crypto module (200). These important security functions are possible since the CM integrates a fully programmable cryptographic processor so that security functions can be one-time hard coded during provisioning by means of fusible program write links. Once the fusible links are set, overwriting, modification, and deleting of those code segments is not possible. The short description of each trusted operation highlights the plausible value the NFC crypto module.

A unique capability of the CM with a trusted NFC interface is the ability to cryptographically pair the smartphone to the CM. One of the first incremental security steps when the CM is brought within the induced magnetic field of the smartphone, is for the two devices to validate that each have been pre-provisioned during enrollment with an asymmetrical key pair. The CM and smartphone execute a mutual challenge—response algorithm (712). If successful, the crypto module decrypts the user's PIN or biometric template stored in internal non-volatile trusted memory and sends it to volatile memory for the next step. If the CM is removed from the smartphone, memory in volatile memory automatically zeroizes.

Yet another capability of the CM with a trusted NFC interface is to execute multiple secure or cryptographic functions and show the intermediate results via the trusted display (734).

Yet another capability of the CM with a trusted NFC interface is to execute strong user authentication entirely within the CM (714).

Yet another capability of the CM with a trusted NFC interface is to execute 2-factor (PIN match) and (736);

Yet another capability of the CM with a trusted NFC interface is to execute 3-factor (Biometric match) authentication within the crypto module hardware (738).

The CM user authentication is done immediately after the mutual challenge response security function (712) since the matching PIN and/or biometric templates are in volatile memory. Note that in both PIN and biometric user authentication matching, the Crypto Module utilizes the smartphone keypad (713) and/or the biometric sensor on the smartphone (715). The data PIN/biometric data is digitized and encrypted through the NFC interface, then decrypted for matching within the CM.

Yet another capability of the CM with a trusted NFC interface is the secure execution of a trusted boot loader (718). The CM verifies the smartphone boots with the proper files and in the proper sequence. Digital signature algorithms (746) verify the data integrity of the boot files and attests that the smartphone is configured in the proper secure state.

Yet another capability of the CM with a trusted NFC interface is the secure execution of digital signatures to verify data integrity (746).

Yet another capability of the CM with a trusted NFC interface is to generate a one-time ephemeral unlock key (derived credential key) to unlock a single encrypted smartphone app (720) or;

Yet another capability of the CM with a trusted NFC interface is the secure execution of several applications nested within a trusted workspace (722). This security functions requires the generation of a random number (740).

Yet another capability of the CM with a trusted NFC interface is the generation of a true random number for various trusted process like; one-time key generation (716), unlocking trusted workspaces (722), and peer-to-peer secure transaction (732).

Yet another capability of the CM with a trusted NFC interface is that every secure transaction between the CM and smartphone, generates a secure audit log (724). This provides the ability of the smartphone to be completely detached from the outside world (such as in a secure facility) yet still be able to execute a secure application locally. Each CM/smartphone one-time key, random number, time/data stamp, and event summary is recorded in a write—only secure log file. This file can store this audit information and make it available at a later time to an authorized Cryptographic Administrator (CA).

Yet another capability of the CM with a trusted NFC interface is to continually monitor and cryptographically verify that the smartphone is configured in a known secure state (726). In all instantiations of this security function, the purpose is for the trusted hardware of the crypto module to independently and continually monitor the security state of the untrusted smartphone hardware, firmware, and software. Verification of smartphone applications, trusted workspaces, user privileges, memory, data/address bus configuration, and peripherals are all included in continual security health monitoring.

Yet another capability of the CM with a trusted NFC interface that is of critical importance is continuous security monitoring of the smartphone baseband I/O's peripherals (717). Digital signatures of the peripheral configuration assigning each I/O to the trusted application running are compared to the pre-stored values in the CM (746). The reason that verification of this security function is so important is the peripherals have notoriously been the most common vectors of malicious attacks. For example, malware placed on the smartphone can remotely turn on the microphone or camera. We will further detail this function later in this paper.

Yet another capability of the CM with a trusted NFC interface is secure zeroization of sensitive data written to volatile memory or registers (728). One security capability this provides is the user's ability to immediately and securely clear all sensitive data and processing, securely closing a trusted app, or prevent residual data from being serendipitously being read at a later point in time. To circumvent known vulnerabilities in residual retention of the most recent data in volatile memory, algorithms over-write the memory with certain data patterns to obfuscate residual data when power is removed.

Yet another capability of the CM with a trusted NFC interface is to execute a secure remote network based wipe (730). This security function allows the CM to execute a remote wipe command across the network from an authorized Cryptographic Authority.

Yet another capability of the CM with a trusted NFC interface is the ability for one user to authenticate a second user and their privilege level. This security service is called Peer-to-Peer (732). User A can cryptographically verify that user B is who they say they are, and they have the security clearance to talk at a particular access level (i.e. Sensitive but Unclassified, Secret, Top Secret). This algorithm is executed directly between User A and User B crypto modules. The algorithm and cryptographic keys are pre-stored in each user's trusted memory and replaces the third party network authentication server.

Since NFC can be vulnerable to a number of threats, the cryptographic functions described above are necessary for a security overlay to the smartphone. It's possible to pick up messages, alter information in live communications and store messages with the intention to replay them with the same or altered content at a later time.

Finally, another capability of the CM with a trusted NFC interface is the ability to overcome these threats, by implementing authentication, integrity check, and confidentiality and replay protection.

The CM integrates a trusted display for the exclusive purpose of securing show intermediate results or feedback on pending secure processes. Any one of these secure functions described above are typically concatenated together. Yet another capability of the CM with a trusted NFC interface is the ability to execute sequential secure functions and visually display the results on the trusted CM display.

5.0 Securing the Smartphone Peripherals

One security vulnerability of NFC not much different than all the types of radio communications, including in smartphones today, is radio jamming. For instance, intentional interference can be created by sending noise on certain frequencies or frequency bands. Although this threat will always exist in wireless communications, the unique magnetic inductive coupling of NFC compared to the other integrated smartphone antennas, make NFC inherently more difficult and more expensive to jam.

Figure 8:
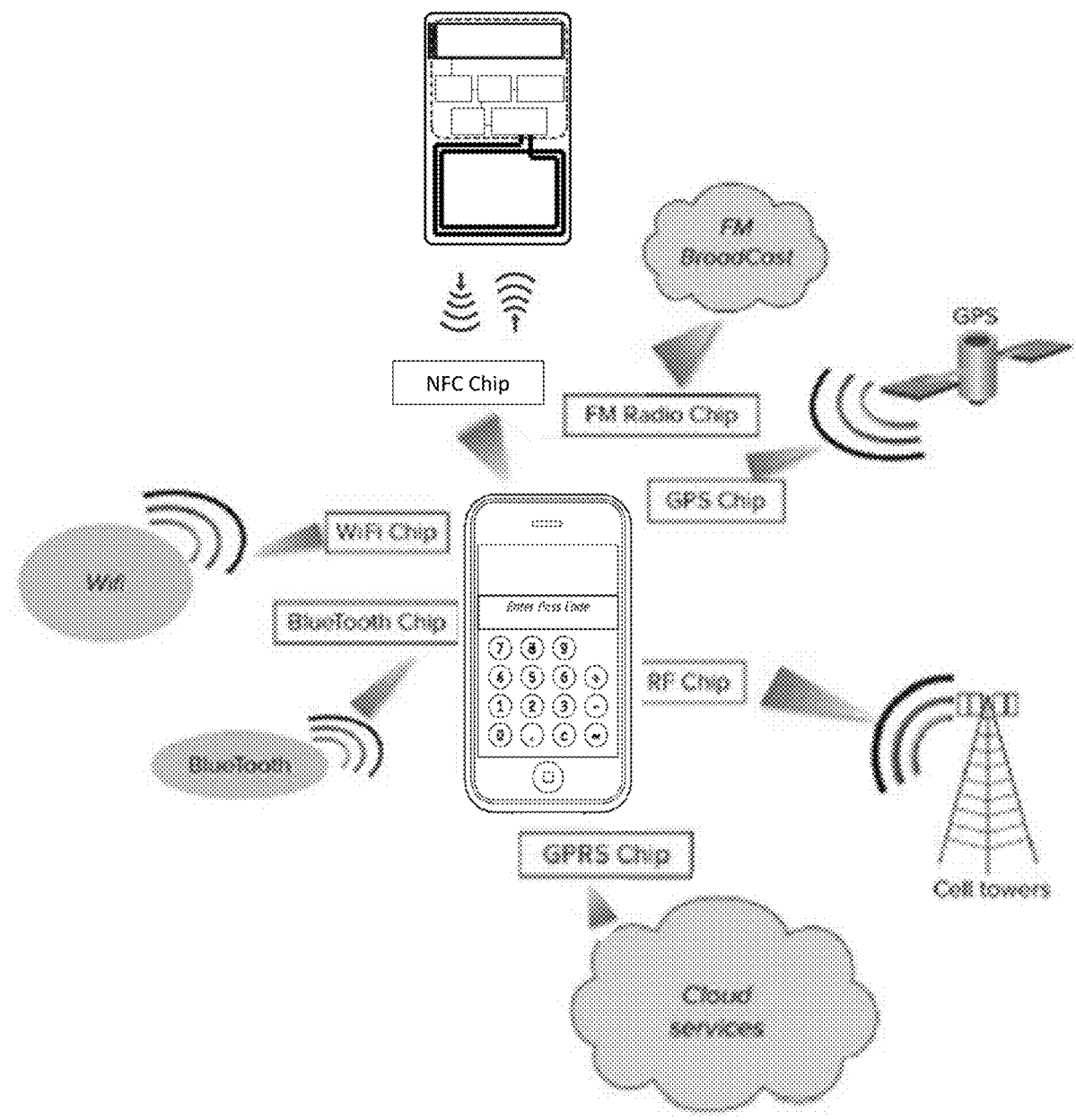
FIG. 8 is a diagram illustrating multiple communications channels of a mobile device that may be used with a cryptographic module in accordance with a preferred embodiment of the present invention.

FIG. 8 is a diagram illustrating multiple communications channels of a mobile device that may be used with a cryptographic module in accordance with a preferred embodiment of the present invention. The baseline premise for securing smartphone or mobile device peripherals is that NFC is the ideal choice compared to other smartphone wireless links to establish a secure gateway to the smartphone. Once established the CM/smartphone link with NFC, the secure processing environment of the crypto module provides configuration and continuous security monitoring of the other smartphone I/O peripherals shown in the diagram.

For easier integration to any commercial smartphone, the crypto module is compatible and compliant with all ISO NFC standards. NFC has been derived from the same platform as ISO/IEC 14443 (type A & B). This contactless card protocol is widely used in access control and public transport cards and mobile payment (i.e. Google Wallet, Apple Pay, etc.). The CM is also compliant with ISO/IEC 18092 added later for active powered cards and to some extent ISO/IEC 15693 (Vicinity Cards).

Yet another security feature of the NFC crypto module is that any NFC enabled phone should be able to interface with any feasible public security overlay and framework. Moreover, the CM to be widely deployable between commercial phone vendors and still offer sufficient security for multiple trusted smartphone applications like secure voice, text, email, and video.

Integrating an antenna in a cell phone is more complex. The integration has to be done individually on each phone, to make both the GSM antenna and the NFC antenna as effective as possible. As for phones with manufacturer integrated NFC-capabilities, the antenna is usually integrated on the Printed Circuit Board (PCB), inside the plastic back cover, or on the battery. The effectiveness of the antenna depends on the rest of the metal chassis and other components that may interfere with the radio communication. The antenna must also be able to generate a magnetic field within the limits defined by ISO/IEC 18092.

From experimentation and empirical testing of over a dozen commercial smartphones we've measured the maximum power coupled into the crypto module to be around 10 m Amp. The power coupling efficiency is highly dependent on other impedance-matching circuits, localized metal surfaces, overlapping turns and insulation materials used to create the proper resistance, capacitance, and inductance, geometry and length of antenna loop, and many other design factors.

The effectiveness of an antenna is measured by a Q-factor, or quality factor. The resonance frequency ($f_{RES}$) should be near the carrier frequency, but not below.

Countermeasures to Protect the I/O Vulnerabilities

Smartphones incorporate the capabilities of computing, environmental sensing, user authentication, and communications for complex applications. They can seamless interface with cellular and data networks using the general architecture or anatomy below. Although smartphones have powerful computational capabilities similar to a laptop/desktop, their internal hub and spoke architecture is very different and much more vulnerable.

The main difference between the architectures between PC/laptops and smartphones is the smartphone core application processor (701) has a single data bus (740) which connects to the peripherals and the outside world. With PC/laptop architectures, they typically deploy a two data bus architecture were the core microprocessor is more isolated from the external peripherals.

Protecting Various Classes of Peripherals

Figure 9:
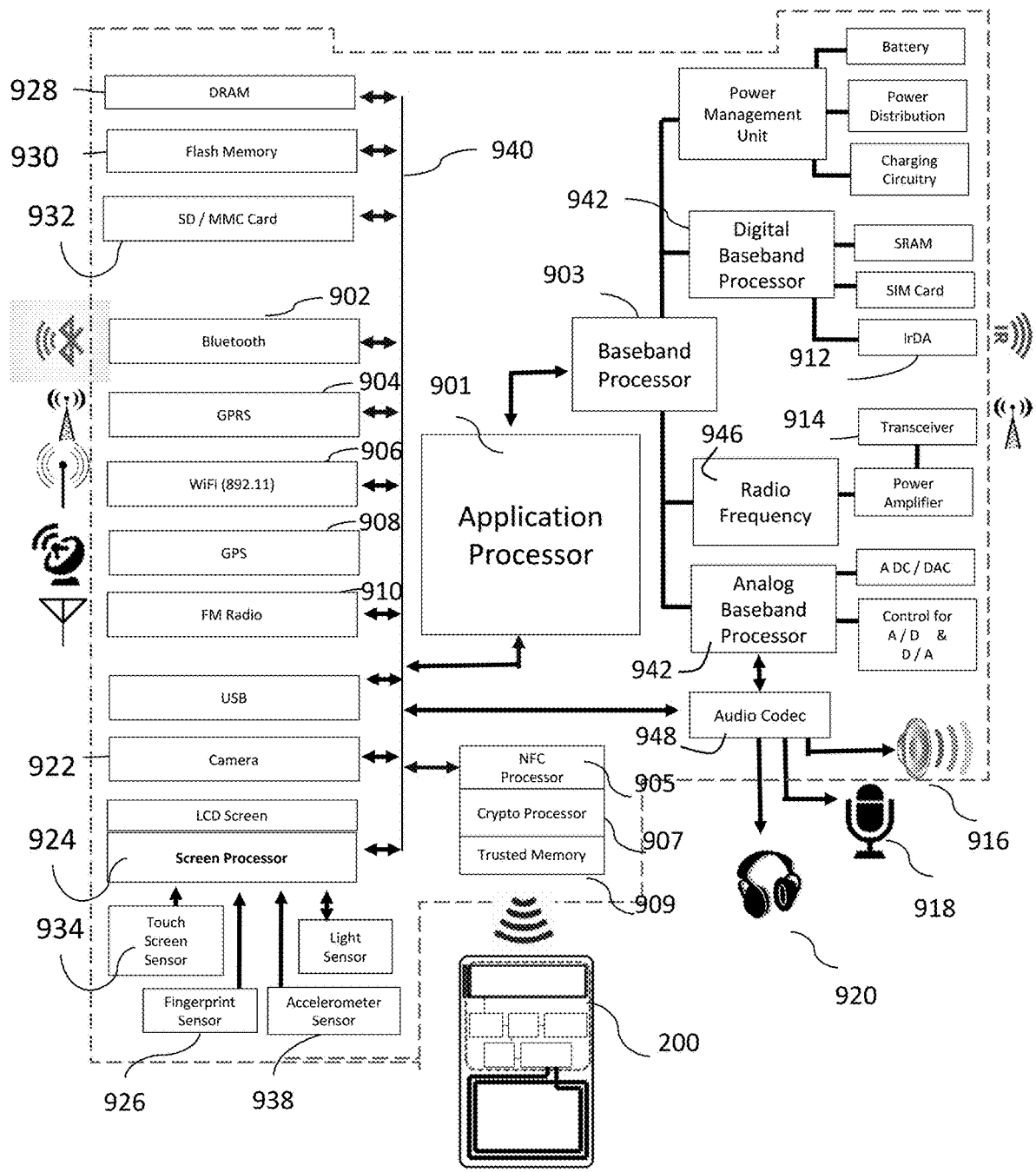
FIG. 9 is a flow diagram illustrating how the crypto module of the present invention comprehensively secures each of the peripherals, which can be grouped into six (6) different classes detailing the operational counter-measure deployed protect and secure the smartphone based upon the known vectors of attack
Figure 10A:
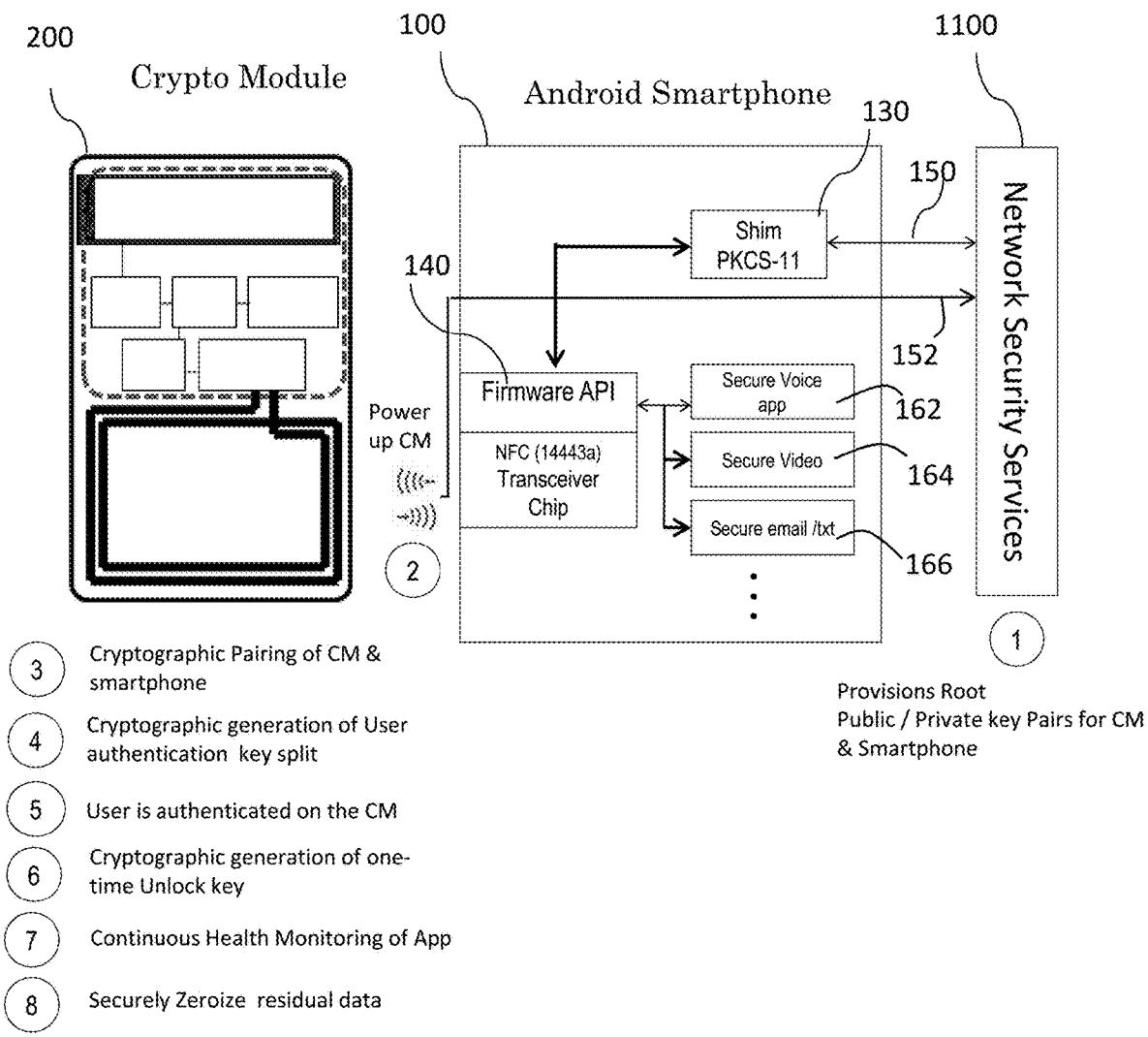
FIG. 10A is block diagram illustrating system operation during cryptographic unlocking of a mobile device trusted workspace using a trusted hardware execution environment in accordance with a preferred embodiment of the present invention.
Figure 10B:
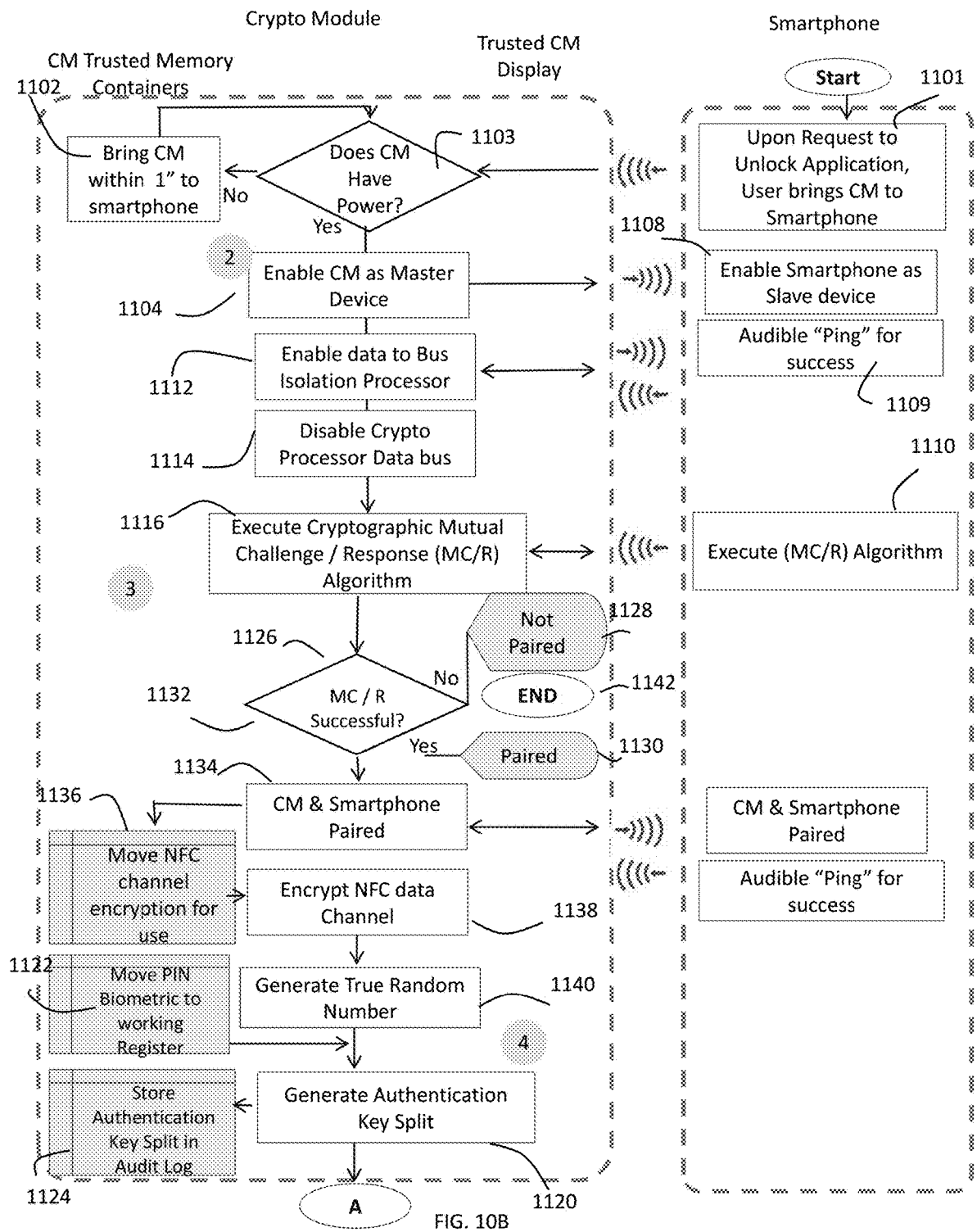
FIGS. 10B and 10C are flow charts of a method for cryptographically unlocking a mobile device trusted workspace using a trusted hardware execution environment in accordance with a preferred embodiment of the present invention.
Figure 10C:
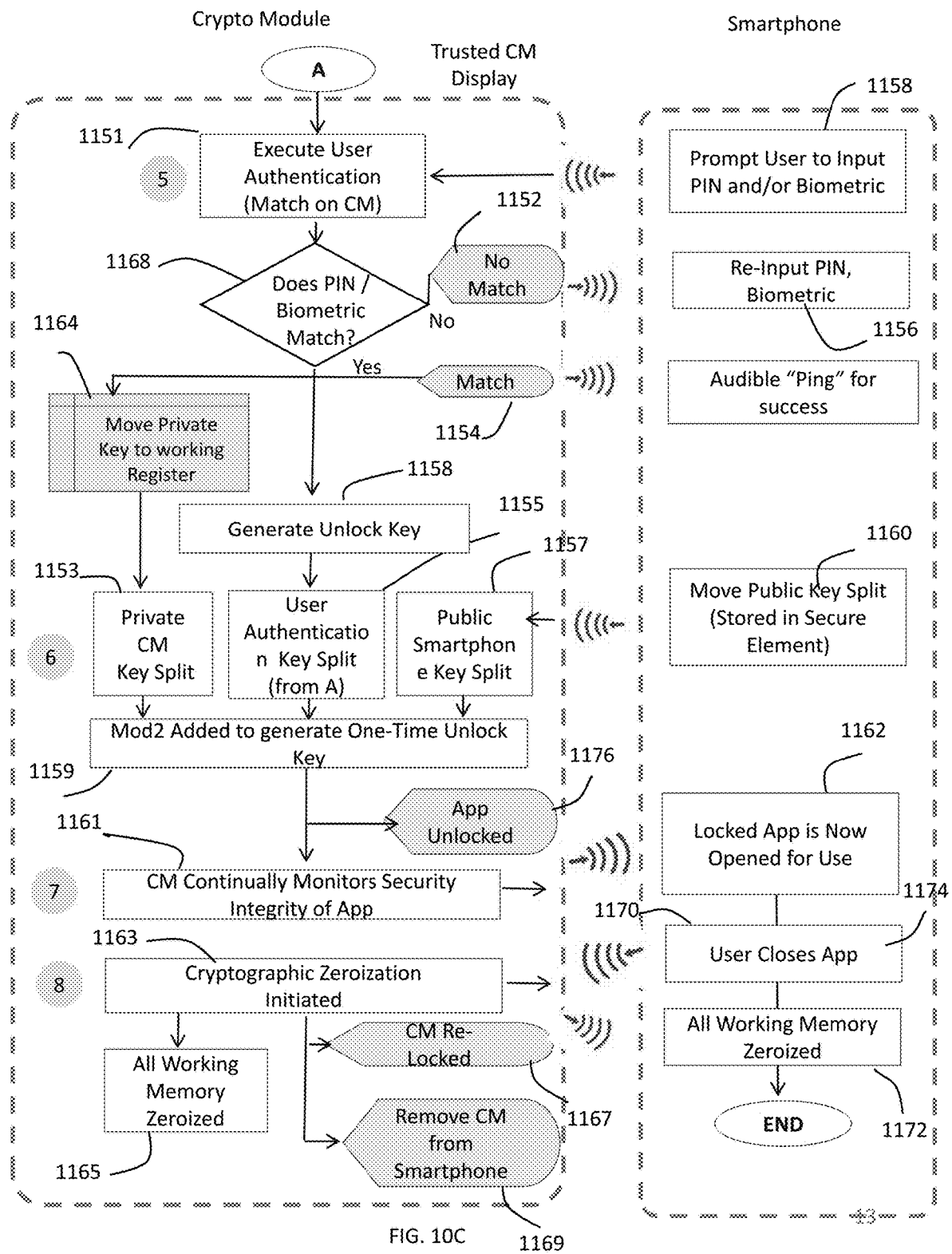

The general anatomy or architecture of smartphone varies slightly between vendors, however, most share a single bus design as shown in FIG. 9. This mobile architecture is effective for interoperability between smartphone venders and simplifies integrating new phone features like memory, sensors, and additional radios. However, this hub and spoke type architecture is very bad and challenging to overlay security. Why this anatomy is so susceptible to attacks is simple—the central application processor (hub) is radial connected (spokes) to the outside world through single data bus (940). Hackers have many vectors of attacks through any of the peripherals and a common method or apparatus to counter these attacks exist today.

The primary microprocessor of the smartphone is the Application Processor (AP) (901) and is directly connected with every device resource, memory, sensor, and connection to six or more antennas. The application processor is a multi-core general-purpose processor that is used for providing user interface applications on the smartphone. Most smartphone, tablet, and wearable device vendors implement this anatomy of a smartphone using a single data and address bus (940) where the AP 901 is the hub and all peripherals are tethered off of the hub. The single bus smartphone architecture that has evolved makes securing the smartphone very challenging.

Referring to FIG. 9, it is described how the crypto module connected through the NFC can provide robust security to the highly vulnerable peripherals. The crypto module secures and protects each class of peripheral slightly different way without the need of customized secure hardware in the phone.

To illustrate and describe how the crypto module comprehensively secures each of the peripherals, the peripherals are grouped into six (6) different classes detailing the operational counter-measure deployed protect and secure the smartphone based upon the known vectors of attack. The peripherals are sometime shared between classes but, as shown in FIG. 9, are generally grouped as;

1. Memory class (928, 930, 932)
2. Internet of Things (IoT) Peripherals (902, 904, 906, 908, 910)
3. Touch Screen I/O (934, 938)
4. Biometric Sensor I/O (926, 922, 924, 908)
5. Common I/O Peripherals (906, 908, 927, 920, 918, 916, 912)
6. Special Cellular Peripherals (916, 918, 920)

Protecting Memory

The application processor has access to various types of memory like DRAM (928), FLASH (930), EEPROM (932) and memory integrated inside the AP. The application processor shares most of this memory with other smartphone processors by assigning separate portions of the integrated RAM and Flash memory depending upon demand. Therefore, each processor is provided access to its own memory address space.

A security feature of the crypto module and the trusted NFC data bus is to cryptographically verify the proper memory access and the memory allocation assigned to running trusted applications. Insuring only the correct block of memory is permitted access and cannot extend outside its pre-assigned area, is critical in thwarting common memory attacks. To achieve these security measures to protect and isolate memory, the crypto module constantly monitors the data integrity of the memory configuration using digital signature algorithms. The CM executes this in hardware independent and isolated from the application processor.

Protecting the IoT Class of Smartphone Peripherals

As shown in FIG. 9, the application processor is also directly connected through a single common data bus (940) to potential outside attacks through its many radios with antennas. These include, Bluetooth and Bluetooth Low Energy (902) and GPRS supporting SMS, MMI multimedia messaging service, push-to-talk, Instant messaging, point-to-point, and point to multi-point (904). Additional antennas include; WiFi-802.11 (906), GPS (908), FM (910), Infrared (912), and 4G/5G cellular (914).

Most of these peripherals have a hardware embedded micro controller to automatically configure multiple protocols that are coded in firmware by the smartphone vendor or chip supplier. In addition, none of these radios can be disabled or isolated electrically from the bus. These radio peripherals are enabled through firmware from the applications requesting the peripheral. It is relatively easy for malicious firmware or rogue applications to enable and eavesdrop even from remote devices outside the smartphone.

Yet another security feature of the crypto module and the trusted NFC bus is to cryptographically verify using a digital signature algorithm. The smartphone radios not required by an open application, are disabled preventing any other application access. To achieve these security measures and prevent malicious running apps from access, the crypto module continually verifies the proper access and data bus configuration between the application processor and the peripherals.

Protecting the Touch Screen

Continuing with reference to FIG. 9, most touch screens (934) on smartphones today have no physical keyboard. Instead, the user types on the software keyboard on the screen. Since there is neither sound nor electromagnetic emanation from a virtual keyboard, the attacker can no longer infer keystrokes based on these signals. In most cases, a rogue application cannot read keystrokes unless it is active and receives the focus on the screen.

Password skimming has been a staple in attacks on PC and laptops. A false sense of trust in the smartphone touch screen exists for hackers to extract the user's password while they enter it.

It has been realized that touch screens are in fact vulnerable to extracting the users PIN by use of the accelerometer sensor (938) using a software app running in the background. Motion detected by the accelerometer can be translated by the application easily back to the inputted PIN since typing on different locations on the screen causes different vibrations, motion data can be used to infer the keys being typed.

Yet another security feature of the crypto module and the trusted NFC bus is to cryptographically verify via digital signature algorithm and;

Allow exclusive access to the touch screen only to the CM when the user is inputting their PIN.

Encrypt the data between the NFC processor (905) and the touch screen processor (924). The symmetric key is stored in trusted memory (909).

Disable the accelerometer sensor (938) during the PIN authentication process.

Yet another security feature of the crypto module and the trusted NFC bus is to continually monitor during execution of the PIN match process in the proper data and address bus access setting. This security monitoring is performed by the CM trusted hardware independent and isolated from the application processor.

Protecting Biometric Sensor

When 3-factor biometric authentication is desired, sensors like the fingerprint sensor (926) and camera (922) must be isolated and protected from the application processor. Peripherals like these are input-only and subject to spoofing and man-in-the-middle attacks.

Some smartphones have a separate dedicated fingerprint sensor (926) integrated within the hardware. Other biometrics like facial, iris, vein, and pulse oxygen utilize the smartphone camera (922). The most recent multi-factor gesture biometrics use combination of peripherals like the smartphone camera (922), the accelerometer (938), fingerprint sensor (926), touch screen (924), and GPS (908).

In all biometric variations described above, the sensor peripherals are vulnerable to attack. In addition, biometric matching requires the application processor's high performance and memory for pre-processing of the live biometric image. Since biometric algorithms are statistical based in nature, the "live" biometric image is compared to the pre-stored "template" to verify the user's identity.

Yet another security feature of the crypto module and the trusted NFC bus is the capability to execute trusted 3-factor single or multi-modal biometric authentication. In general, the crypto module with trusted NFC data bus executes these functional steps;

Only the CM has access to the biometric sensor when the user is capturing their live image The data between the NFC processor (905) and the biometric sensor (926) is encrypted. The symmetric key is stored in trusted memory (909).

Only the trusted application on the smartphone executing the pre-processing of the live biometric is connected to the data bus.

When the live biometric image is pre-scaled down to the size of the biometric template, it is encrypted and sent to the crypto module (200) through the NFC processor (905) and crypto processor (907).

The crypto module (200) decrypts and executes the match between the pre-scaled live biometric and the pre-stored biometric template.

The crypto module display shows the result of a biometric match or non-match, and then proceeds with the next trusted process.

At no time during the biometric matching process is the user's biometric template exposed for possible exploitation outside of the crypto module.

Yet another security feature of the crypto module and the trusted NFC bus is to execute a 3-factor authentication process by leveraging a biometric sensor on the smartphone, leveraging the smartphone application processor for pre-processing, the final biometric match is then executed by trusted hardware within the CM.

Protecting Common I/O Peripherals

Common peripherals embedded into a smartphone are defined such as;

WiFi (906), GPS (908), Camera (922), USB, headphone port (920), microphone (918), infrared (912), and the speaker (916).

These classes of smartphone peripherals all are connected on a single bus (940) directly to the application processor (910). They are defined as a group since they are protected in the identical manor by the crypto module. Moreover, these common peripherals do not require any custom security hardware embedded within the smartphone.

These peripherals share the same common attack vector. For example, an adversary can implant malware into the smartphone to remotely turn on the microphone or camera converting the user's phone into a bug for nefarious purposes.

A security feature of the crypto module and the trusted NFC bus is to cryptographically verify the configuration of these common peripherals ensuring no other application can gain access to the peripheral. To achieve these security measures to protect and isolate the peripheral, the crypto module constantly monitors the data integrity of each peripheral assigned to the running application. The CM executes this in hardware independent and isolated from the application processor.

Protecting the "Special" Cellular Peripheral

From FIG. 9, a baseband processor (903) is employed to control and manage the components that interface with the cellular towers. The baseband processor is unique to the mobile architecture since it is directly and separately connected to the core application processor (901).

The baseband processor supports a complex set of components including; a digital baseband processor (942), an analog baseband processor (944), and a radio frequency block (946) supporting 2G (GSM), 3G (UMTS), and 4G (LTE) mobile network generations. The baseband processors (903, 942) also share peripherals with the application processor through an audio codec (948) including the microphone (918), the speaker (916), the headphone port (920), and the IrDA (912). The Audio Codec is responsible for the processing of analog and digital audio signals received through microphone, earpiece speaker headset and ring tones and the vibrator circuits.

Several other design features of smartphone baseband processor make it "special" in the method by which the crypto module through the NFC port can secured. These unique features include:

The authentication exchange between the Cellular tower and the smartphone and

The special smartphone circuitry deployed in the baseband processor universally manages E911 calls.

Because the cellular authentication protocol is well established and the baseband processor functions are separate and very different than the rest of the functions within the smartphone controlled by the application processor, the crypto module is not as effective alone in augmenting security.

There are two vectors of attack; Denial of Service through flooding and masking your user identity when attempting to establish fictitious emergency calls. It's the later E911 attack vector that is most problematic to circumvent. One reason is the crypto module implements a user authentication process that establishes a root-of-trust leading to an encrypted data channel between the CM 200 and the application processor (901). In parallel, the CM constantly and continual monitors the data channel and configuration to detect penetrations.

The E911 authentication protocol provides an intentional back door to non-authenticated users to penetrate through the baseband processor to the application process. In fact, E911 is enabled on all phones universally even without SIM cards. The source of the E911 backdoor is the IMSI (International Mobile Subscriber Identity) and the IMEI (International Mobile Station Equipment Identity) data exchanges, which occur during E911, call setup.

The IMSI is a unique identification number, used to identify a mobile subscriber across all cellular networks. This number is stored in the SIM card as a 15-digit number. For privacy reasons a randomly generated TMSI (Temporary Mobile Subscriber Identity) is often used instead of the actual IMSI for authentication, location updates, paging, call requests, and other activities. The IMEI is a 15 digit number for identifying mobile equipment (e.g., mobile phones and cellular modems) in cellular networks. The cellular network can request the IMEI of a device during the authentication phase.

When a user dials an emergency number, an identity exchange occurs with several authentication parameters including the IMSI and IMEI. However mobile phones can be easily infecting by;

Smartphone with malware through app markets, email attachments, compromised websites and malvertising campaigns, and malicious SMS/MMS with a fake IMSI number.

Hides its subscriber information (IMSI) from the network—implemented within the firmware of the smartphone baseband processor. The malware accomplishes this by virtually entering No-SIM state, a state where only the IMEI is exposed to the network Implant malware that makes 911 calls from the smartphone's main OS (e.g., Android and iOS). When doing so, the identifiers (IMSI/IMEI) are exposed to the cellular network without interfering with the baseband firmware.

Malware that randomizes the identifier (IMSI or IMEI) provided to the cellular network and is implemented within the firmware of the device's baseband processor. It cannot be blocked by use of a blacklist implemented in the cellular network, E911 network, or at the cellular network because the IMSI identifier changes before every call.

An effective method to circumvent this issue is to either isolate the baseband processor with a customized version that is deeply integrated to the cryptographic module. For example, the crypto module would hold the IMSI key and cryptographically verify the IMEI key before enabling the E911 call.

Finally, a security element of the crypto module and the trusted NFC bus is to protect the special class of smartphone peripheral—the cellular baseband is feasible, but it requires some customization hardware within the smartphone.

To achieve these security measures to protect and isolate the peripheral, the crypto module will store IMSI and IMEI authentication keys, constantly monitor, the data integrity of the peripheral, and securely communicates with a customized baseband processor on the smartphone. Both the CM and custom baseband processors execute trusted processes independent and isolated from the application processor.

Secure Unlocking/Locking of a Trusted Smartphone Application

Referencing FIG. 11A, a distinct example of how implementing a series of trusted processes in series within the crypto module is described. In this use case, device and user authentication methods are intrinsically paired with cryptographic systems in a set order. The CM (200) launches a series of independent sequential cryptographic steps prompting the smartphone (100) and displaying intermediate values and messages on the CM display (260) resulting in the generation of a one-time (ephemeral) key decrypting a trusted software application on the smartphone for use.

There are several security advantages for encrypting apps and data in an Android application using the CM like:

To ensure that files exported to shared storage are not easily accessible to other apps To encrypt sensitive information such as authentication information in the crypto module rather than with the smartphone.

To execute a policy where content is only accessible to users who own the appropriate crypto module key to access it.

To provide Data-at-Rest to the trusted application meaning when the CM is not tethered to the smartphone, it is impossible for a hacker to decrypt and exploit the trusted application.

The cryptographic unlock function is a unique and core capability of the CM. The Unlock/Lock function is one of many sets of secure functions the CM executes, yet several of the incremental cryptographic steps of the Unlock are shared with other CM capabilities like Peer-to-peer.

The security advantages the methodology for the unlock function compared to traditional approaches are significant. For instance, if the unlock key is stored along with the encrypted data in the smartphone, or even as a file private to the application, it is fairly easy for a hacker to extract the key, especially on a rooted device.

Unlocking an encrypted application on the smartphone requires utilization of both asymmetric and symmetric cryptographic algorithms. Generally, asymmetric cryptographic systems require more computational "energy" for encryption and decryption than symmetric systems. Therefore, the CM unlock protocol is a hybrid system in which an asymmetric system, such as a public key system, is first used to establish a "session key" for use between the CM and smartphone for device and user authentication. Then this common session key is used in a conventional symmetric cryptographic system to transmit message (key splits) and NFC channel between the CM and smartphone.

The Cryptographic Unlock Overview

FIG. 11A shows the eight (8) sequential steps required to cryptographically unlock an application using a key generated within the crypto module. The Crypto Module (200) and Smartphone (100) blocks have been thoroughly discussed previously. The Network Security Services Block (1100) will be introduced and is needed to place the initial seed cryptographic keys.

| Summary of the Steps of the Cryptographic Unlock/Lock | |
|---|---|
| Step 1 | Generates the original or root public and private key pair during the provision process. This is executed by the network security service and must be trusted |
| Step 2 | CM is parasitically powered by smartphone and establishes control of the NFC data bus |
| Series of CM Cryptographic Functions | |
| Step 3 | Cryptographic paring between CM & smartphone. Successful result transfers user PIN and or biometric template from data container to working memory |
| Step 4 | Cryptographic generation of authentication key split. Successful generation copies key into audit data container on CM |
| Step 5 | User is authenticated on CM using PIN and/or biometric inputted at smartphone. |
| Step 6 | Cryptographic generation of one-time ephemeral unlock key. Successful generation imitates CM to decrypt app |
| Step 7 | Continuous Security Health Monitoring of Application to ensure the Integrity has not been compromised |
| Step 8 | Cryptographic Zeroization of all registers in CM and smartphone holding temporary keys |

The Protocol Description of the Unlock Function

Step 1: Obtaining the App and Keys from the App Store

The Network Security Services (1100) provide several needed security functions for the CM and smartphone to operate securely. The first is these secure functions are a trusted application store whereby a user can download an application that has been vetted and does not contain malware. The second required network service is binding the associated root cryptographic keys to the downloaded application. Network Security Services authorize the user prior to downloading the application.

The CM and commercial smartphone are designed to be interoperable with any Network Security Service (NSS) to download the encrypted app and associated keys. What is unique is the ability for the CM to directly communicate with the NSS with exposing any data to the smartphone. A user can only use this feature if they are pre-enrolled and provisioned their crypto module to that NSS.

Once pre-enrolled and provisioned with the proper cryptographic root key, several secure capabilities are now feasible. Secure capabilities include; over-the-air rekeying, trusted application download, updating audit logs, and more. It is important to note that these added security capabilities are achieved with limited trust of the smartphone.

Within the commercial smartphone, a Shim firmware block (130) and the API firmware block (140) are required. These two firmware blocks function as translators to convert network PKCS-11 protocols to NFC protocols. The protocol translator provides either encrypted communications data channel (150) or an unencrypted data channel (152) between the CM and NSS.

In summary, this first step provides the roots cryptographic keys and key pairs to unlock an application. The crypto module pre-stores the private key in a trusted memory container and the smartphone stores the Public Key typically in the Secure Element.

Step 2: CM is Parasitically Powered by Smartphone and Establishes Control of the NFC Data Bus It's been previously discussed in this patent disclosure the security advantages of the CM establishing control of the NFC bus. The important goal of switching bus control to the CM is to minimize the need for hardware trust anchors in the smartphone.

The unlock process is initiated by a display prompt on the user's phone. When the user clicks on a locked application (162, 164, 166), a call request (1101) is initiated to the user to insert their CM to the back of the smartphone. Bringing the crypto module within 1 inch (15 cm) of the smartphone (1102), the two magnetic fields between the antennas of the CM and the smartphone induce power to the CM (1103). Transparent to the user, the CM establishes itself as the master controller of NFC (1104). Consequently, the smartphone becomes the slave device (1108). An indication of success of these operations, such as an audible ping (1109) from the smartphone or displaying a message on the CM's trusted display, may be implemented as part of the sequence.

A foregoing security feature of this method of switching bus control to the CM is isolating and denying NFC bus access from the smartphone to potential malicious attacks.

Several other secure functions are sequentially executed including enabling the data bus on the Bus Isolation microprocessor and disabling the data bus on the Crypto Processor. Both of these processors are integrated into the CM as described previously and provide yet another security feature of this method to isolate trusted processes and data stored within the CM.

Step 3: Cryptographic Pairing of the CM and Smartphone

This step is the first in a sequence of steps to establish isolation of the crypto module for independent and trusted processing (1112) and disable the crypto processor data bus (1114). The CM first launches a cryptographic based mutual challenge/response function with the smartphone (1116).

Mutual Challenge/Response (MC/R) algorithms are also referred to as two-way device authentication. MC/R is a secure mathematical function executed within the CM to verify cryptographically (using the pre-placed keys) results with the right value. Any number of MC/R algorithms can be implemented with this method since the crypto processor within the CM is programmable. With this process, the CM authenticates to a mobile device (1116) followed by the mobile device authenticating itself back to the CM (1110). In general, the CM is programmed to implement the same asymmetrical key pair every session. For more robust forward secrecy, the CM could choose a new pair in each session or user longer keys. Stronger cryptographic MC/R functions are feasible since the CM has an onboard true randomizer and a full suite of programmable crypto library functions. In practice however, generating a private large prime number within the crypto module could take up to 10 seconds.

A typical MC/R function is now described. Executing the mutual challenge response algorithm, the crypto module first generates a TRUE random number (r), encrypts (using DHEC algorithm) it with its private key then forwards the result to the smartphone along with (r). The smartphone decrypts the value with its public key then compares (r) decrypted with (r).

If they match, the smartphone knows the crypto module is a valid entity. In response, the user encrypts a new true random number generated, encrypts the value using its private pre-stored key, and forwards both values to the crypto module. Upon receiving, the crypto module decrypts the data using its public key and compares it to the random number. If they match, the crypto module is confident the smartphone has been is a known pre-paired phone. The CM display indicates to the user, that the phone and CM are paired. The CM writes the index record to the audit container with the random number.

If the MC/R cryptographic function fails, it means the crypto module has not been pre-paired to that specific smartphone. Through the trusted CM display (828) it visually informs the user a possible attempt has occurred to hack into their CM. The CM immediately disables the NFC communication channel and writes an audit log entry of the event into the CM audit memory container.

Yet another security advantage of the unlock method is to prevent possible malicious outside attack and then record possible threat in a locally stored audit log. In another possible scenario is the CM user connects their card to a smartphone not containing pernicious malware but simply an app with an expired key. Although the CM cannot segregate between a non-trusted app and an app with an expired key, both are detectable by the MC/R algorithm and inform the user with the CM display.

Upon successful MC/R function (1126), the trusted CM display indicates a successful cryptographic pairing (1130). In parallel, a memory call is made to a trusted data container to move a symmetric NFC channel encryption key to working memory. This key is used to encrypt contents of the NFC channel (1138) between the CM and smartphone using any algorithm of choice in the crypto processor.

Yet another security advantage of the unlock method described is the unique capability to encrypt the NFC channel prior to any keying or sensitive user information being exchanged.

The next consecutive cryptographic function executed following encrypting the NFC channel is the generation of a random number (1140). The crypto processor with the CM has a true hardware based random number generator. Yet another advantage of an embedded randomizer is the thwart know attacks from weaker pseudo randomizers.

Lastly upon successfully pairing of the devices, encrypting the channel, and generating a random number, the CM transfers the users PIN and/or Biometric template from a trusted data container to volatile memory register for the next unlock function.

A primary security feature of this method of sequentially moving sensitive data like PIN/biometric templates from encrypted memory containers to volatile memory like RAM is the data zeroizes when power is removed (i.e. CM is moved away from the smartphone). A second security reason is sensitive data is segmented and move only after the MC/R cryptographic algorithm is executed successfully. The potential attack surface is greatly reduced with this method.

Step 4: Cryptographic Generation of Authentication Key Split

The next sequential cryptographic function executed by the CM is the generation of the Authentication Key Split (1120). Although there are several different algorithms to accomplish this function, the objectives are to maximize entropy and generate a new one-time (ephemeral) key for each unlock session.

The Authentication Keys split algorithms are very different for PIN/passwords then for biometrics yet since the crypto processor chip is fully programmable, any customized authentication key split algorithm can be employed. For simplicity, we present only the PIN generated authentication key split function that meets the entropy and ephemeral requirements.

The user's PIN data is currently in volatile memory in the CM. A random number was generated in the previous step and is stored in a second volatile memory register in the CM.

A typical cryptographic function to generate the Authentication key split is described as follows; The PIN is concatenated with the random number—padded out to fill 128-bit register. PINs and passwords generally use a small number of digits since it is impractical for a user to remember longer ones. The random number used to pad out the register providing increased entropy. The random number also produces the unique ephemeral component. The 128-bit PIN with random padding is then inputted to a digital HASH algorithm and executed five (5) times. The resulting value after the HASH function becomes the Authentication Key split. The Authentication Key Split is moved to a temporary working register until needed. The authentication key split is also copied to the Audit Log trusted data container (1124).

Yet another advantage the method of generating a unique authentication key split with just a random number generator, a HASH algorithm, and trusted storage containers are the ability to efficiently generate a new key split without a large memory like traditional techniques.

FIGS. 11B and 11C flow charts of a method for cryptographically unlocking a mobile device trusted workspace using a trusted hardware execution environment in accordance with a preferred embodiment of the present invention.
Step 5: User Authenticated In some higher security applications, technology developers of advance tokens integrate a trusted keypad for inputting PIN and/or a biometric sensor like fingerprint scanner inside the token. This methodology is impractical, expensive and more difficult to integrate with commercial smartphones.

A more practical and executable method separates the PIN or biometric capture from the token executing the matching. With the new methodology, user's authentication PIN and/or biometric capture occurs on the smartphone and the final matching is executed on the crypto module.

Advantages of this architecture include:

It simplifies the security requirements on the phone,

The CM is broadly more interoperable with most touch screen and biometric hardware used by the smartphone vendors.

Provides a backward compatible that does not compromise the card form factor, connectivity and portability of the card.

The underlying security principle is that the user authentication process always needs human input, and it needs to inform that human about its inner workings. This is the "human in the loop" strategy that is essential to secure operation. The user prompts are displayed, and PIN/biometrics sensors are on the smartphone device, however the results are displayed on the trusted on-card CM display. Furthermore, this human interface requires a distinct trusted input device like the touch screen (for PIN & passwords), camera (for face, iris, vein recognition), and custom fingerprint scanner.

Bridging the chasm between human factor for permitting access and cryptographic functions for protecting data is this method's clearest security advantage. Leveraging all the commercial sensors processing advancements integrated in modern smartphones to execute the image capture and pre-preprocessing down to a small template, and then securely forwarded to the CM for final matching is the single most important security attribute of this design.

Execution of PIN/biometric user authentication is broken down into the following sequential steps. First, the user is prompted by the CM to present their PIN or biometric to the smartphone sensor (1158). This data in pre-preprocessed using the smartphone processor to a small data compressed representation of the image and forwarded encrypted over the NFC channel to the CM.

Next, the CM compares the authentication value forwarded from the smartphone to the pre-stored template value (moved from the CM data container to a working register in Step 4). If the PIN and/or biometric templates do not match, a message is displayed on the trusted CM display indicating no match (1152).

A non-matching result typically launches a second internal timer algorithm in the CM to either limit the allowable follow-on PIN/biometric entry attempts allowed or increases the time allow between the attempts. The CM displays (1152) the results of the match. If no match occurs, the CM sends a message to the smartphone to re-enter password and index then decrements the failed password attempt counter by one.

However, if the PIN and/or biometric values match from the CM function (1168), three (3) things are executed in parallel;

A message is sent to the trusted CM display indicating a successful PIN and/or biometric match (1154)

The contents of a trusted CM memory container holding the users Private Key Split are moved to a working register in the CM (1164). It is important to note that at no time is this very sensitive data ever exposed outside of the CM and, The CM automatically launches into the next cryptographic step of generating a unlock key (1158).

An uncommon advantage of using these methods to strongly bind the user to generating an unlock cryptographic key is relevant because of its broad applicability across smartphones platforms. Moreover, the most vulnerable part of user authentication occurs in the matching phase. Final matching is executed within the protective boundaries of the CM. A successful match does not simply transfer a pre-stored unlock key from CM memory like traditional methods rather, it unwraps the private key split used in the next step.
Step 6: Cryptographic Generation of One-Time Unlock Key Generating an unlock key (1158), sometimes called a one-time key is achieved by combining 3 separate key splits. The end value is the cryptographic key used to decrypt the software application on the smartphone.

The key split architecture provides "Data-at-Rest" where each entity holds one part of the cryptographic unlock key. The smartphone stores the public key split in the most secure memory section call the secure element. The CM stores the private key split in a trust container until needed and the CM verifying the user generates the authentication key split and the authentication key split is generated within the CM.

One advantage of the data-at-rest implementation is if the smartphone is lost or compromised, the application cannot be unlocked. Similarly, if the crypto module and smartphone were hacked to recover their respective key splits, the application cannot be unlocked since the attacker does not have the authentication key split.

The manner of approach in generating the unlock key is as follows:
1. The private key was decrypted from a trusted card memory container (1164) and placed into a working CM secure processor register (1153) as the result of a successful user authentication (1168).
2. The user authentication key split was generated in a previous cryptographic process (1120). The process included generation of a random number (1140) and transferring the users PIN or biometric template stored in a CM memory container (1124) to a working register. This working register is designated in the flow diagram as (1155).
3. The public key split is forwarded by request (1160) by the CM to a working register designated in the flow diagram as (1157).

An important design element of this method is all three key splits reside in volatile memory. If for any reason the CM were removed away from the smartphone, the key split would be zeroized. In this state, the application becomes locked and the CM display informs the user with a message on the trusted CM display (1176).

Be that as it may, there are more sophisticated hacking techniques used to recover data from registers when the power is removed. To address these types of attacks, the crypto processor within the CM incorporates active tamper circuitry. If a tamper event is detected (i.e., power, temp, light), a flag register is set, and all registers are cleared. These sensors are integrated into the inner most layer of hardware in the crypto processor within the CM and an adversary would have to circumvent all 20 layers described in section 1.2.

To generate the one-time unlock key (1159), the CM bit wise concatenates (MOD2 addition) the CM private key split, the smartphone key split, and the authentication key split. The result is a distinctive key stored in a volatile memory register within the CM.

The resulting session key is encrypted and forwarded to the smartphone and used as a key to unlock an application or an application window (1162).

Step 7: Continuous Health Monitoring of App

The vulnerability of an adversary compromising future or past unlock keys are minimized with the utilization of a one-time unlock key. However, while application is unlocked and open, the attack surface is greater. For these reasons the CM uses another security capability to continually monitor the integrity of the open application to insure it has not been modified or compromised with malware.

The continuous security health monitoring cryptographic function is executed within the crypto module is shown in block (1161) when it is open and being used. The intent of a layered defense in depth approach highlights the multiple capabilities of the CM. For example, the CM is used both as an unlock key for apps and a security monitor for that same app when it is opened.

Yet another feature of the crypto module with the trusted NFC interface is the ability to monitor the configuration and safeguard the integrity of an unlocked. The security health monitoring function in this model is contrary to traditional network based models. The crypto module is unique with its capability to locally monitor not remotely monitor like traditional security models using a Mobile Device Manager (MDM) use.

The continuous health monitor is neither effective nor scalable when done remotely like by the MDM. Malware can easily be inserted to a smartphone for example, initiated from a wireless access portal to the smartphone. The three common characteristics of these types of attacks are, the source code origins are remote without any physical access to the smartphone. Second, the malware code infiltrates a large class of smartphones (i.e. all Android OS smartphones running all versions of Android). Third, no one organization controls the software configurations of the user's smartphone including the MDM.

Since a remote MDM cannot control the configurations of its customer's smartphones, the only means to for certain to prevent breaches is to sandbox the app or multiple apps in a trusted workspace within the smartphone. Now, access to this created sandbox space within the smartphone can be constantly monitored locally by the crypto module.

Yet another security feature of using the crypto module as a cryptographic unlock key is the ability to provide local and continuous monitoring that is attested. Attestation means the CM is testing based upon reliable evidence that the state of the software executing the app, the workspace, and the resources that app or workspace access is configured in a known configuration. The CM stores the reference primitives of the secure app or workspace, then cryptographically compare the reference state with the current running app or workspace state. The term attestation specifically means the process of the CM continually executing a sequence of hashes of certain system components followed by a digital signature of that sequence. The digital signatures are then matched to the pre-store primitives. If these two digital signature values match, the app or workspace is still operating in secure manner and no malware is detected.

Yet another security feature of the crypto module as means to cryptographically verify the app or workspace is configured in a known trusted state is its increased flexibility. The CM constantly monitoring function verifies based upon both properties of the app or workspace and identity of the user accessing the app or workspace. In this secure mobility architecture, just because a user has access to a mobile device will not allow them to gain access to an application or workspace. A user cannot unlock the app without strong user authentication since the unlock key is intrinsically part of the process.

Step 8: Securely Zeroize

When a user closes a trusted application (1174) running on the smartphone, the unlock key stored in a register in the Secure Element (SE) is zeroized. The zeroization is launched by a command in firmware. However, all the memory used application when open are not necessarily cleared from residual data. The security function is a more secure method for zeroization insuring all temporary stored data is irrevocably wiped.

There exist a number of different algorithms to securely wipe residual data. Any wiping algorithm can be used since the crypto module is programmable and executes in a trusted execution environment.

One such method used in the crypto module is when the user closes an application (1174), it launches a cryptographic based zeroization algorithm (1163) overwriting multi times the working registers (1165) with digital patterns of ones and zeros. These patterns can be a series of all ones, all zeros, alternating one & zeros, long cycle patterns of digital data generated from a pseudo random generator, or true random data from the on-chip randomizer. Once the zeroization operation is complete, the CM display informs the user the CM is securely and cryptographically locked (1167) and they can remove the CM from the smartphone (1169).

The intent of overwriting the registers multiple times is to counter a known residual charge that is retained on the semiconductor junction within the volatile memory cell. Essentially, these zeroization algorithms mask, flood, substitute different level of residual charge after the normal clear process.

Similar to the continuous health monitor function described in the last section, secure zeroization executed locally by the CM as succinct advantages. Contrary to traditional network based secure mobility model that use a network based application to wipe smartphone data, zeroizing data on smartphones locally simplifies the deployment, scales, and is immeasurably more secure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for securing a mobile device with a cryptographic security token having a secure microprocessor, a secure bus connected to said secure microprocessor, a bus isolation microcontroller connected to said secure bus wherein said bus isolation microcontroller comprising firmware configured to securely control communications through said secure bus to said secure microprocessor, a first NFC antenna connected to said bus isolation microcontroller and a second NFC antenna connected only to said secure microprocessor, the method comprising the steps of:
   requesting on said mobile device to unlock an application using said cryptographic security token;
   placing said cryptographic security token within 1 inch of said mobile device;
   powering said bus isolation microcontroller by energy received through said first NFC antenna;
   powering said secure microprocessor by energy received through said second NFC antenna;
   enabling the cryptographic security token as a master device;
   enabling said mobile device as a slave device;
   enabling data communications through said first NFC antenna to said bus isolation microcontroller;
   disabling data communications through said second NFC antenna to said secure microprocessor;
   executing cryptographic mutual challenge and response between said cryptographic security token and said mobile device;
   generating an audible or visual indicator of successful pairing if said mutual challenge and response is successful; and
   generating an audible or visual indicator of unsuccessful pairing if said mutual challenge and response is unsuccessful.

* * * * *